United States Patent
Kollé et al.

(10) Patent No.: US 7,139,219 B2
(45) Date of Patent: Nov. 21, 2006

(54) HYDRAULIC IMPULSE GENERATOR AND FREQUENCY SWEEP MECHANISM FOR BOREHOLE APPLICATIONS

(75) Inventors: Jack J. Kollé, Seattle, WA (US); Mark H. Marvin, Tacoma, WA (US); Kenneth J. Theimer, Auburn, WA (US)

(73) Assignee: Tempress Technologies, Inc., Kent, WA (US)

( * ) Notice: Subject to any disclaimer, the term of this patent is extended or adjusted under 35 U.S.C. 154(b) by 317 days.

(21) Appl. No.: 10/777,484

(22) Filed: Feb. 12, 2004

(65) Prior Publication Data

US 2005/0178558 A1 Aug. 18, 2005

(51) Int. Cl.
*E21B 21/10* (2006.01)
(52) U.S. Cl. ............... 367/85; 166/373; 166/177.6; 166/321; 251/28; 137/105
(58) Field of Classification Search ............ 166/373, 166/177.6, 321, 301, 311, 308.1; 251/25, 251/28; 137/105; 175/1, 40, 57; 367/85
See application file for complete search history.

(56) References Cited

U.S. PATENT DOCUMENTS

| | | | |
|---|---|---|---|
| 699,273 A | 5/1902 | Wolski | |
| 1,963,090 A | 6/1934 | Jakosky | 255/1 |
| 3,648,789 A | 3/1972 | Eriksson | 175/292 |
| 4,033,429 A | 7/1977 | Farr | 181/106 |
| 4,817,739 A | 4/1989 | Jeter | 175/38 |
| 4,979,577 A * | 12/1990 | Walter | 175/56 |
| 4,997,159 A * | 3/1991 | Yoshino et al. | 251/29 |
| 5,191,557 A | 3/1993 | Rector et al. | 367/41 |
| 5,222,425 A | 6/1993 | Davies | 91/273 |
| 5,396,965 A | 3/1995 | Hall et al. | 173/73 |
| 5,740,127 A * | 4/1998 | Van Steenwyk et al. | 367/85 |
| 5,803,188 A | 9/1998 | McInnes | 175/92 |
| 6,053,261 A | 4/2000 | Walter | 175/234 |
| 6,094,401 A | 7/2000 | Masak et al. | 367/84 |
| 6,237,701 B1 | 5/2001 | Kollé et al. | 175/1 |
| 6,394,221 B1 | 5/2002 | Cosma | 181/113 |
| 2004/0069530 A1* | 4/2004 | Prain et al. | 175/40 |
| 2005/0028797 A1* | 2/2005 | Janssen et al. | 123/568.26 |

OTHER PUBLICATIONS

Rector, J.W., III, and Marion, B.P. "The use of drill-bit energy as a downhole seismic source." Geophysics. vol. 56, No. 5 (May 1991): P.628-634, 9 FIGs.

(Continued)

*Primary Examiner*—David Bagnell
*Assistant Examiner*—Daniel P. Stephenson
(74) *Attorney, Agent, or Firm*—Ronald M. Anderson

(57) ABSTRACT

This invention discloses a valve that generates a hydraulic negative pressure pulse and a frequency modulator for the creation of a powerful, broadband swept impulse seismic signal at the drill bit during drilling operations. The signal can be received at monitoring points on the surface or underground locations using geophones. The time required for the seismic signal to travel from the source to the receiver directly and via reflections is used to calculate seismic velocity and other formation properties near the source and between the source and receiver. This information can be used for vertical seismic profiling of formations drilled, to check the location of the bit, or to detect the presence of abnormal pore pressure ahead of the bit. The hydraulic negative pressure pulse can also be used to enhance drilling and production of wells.

46 Claims, 19 Drawing Sheets

OTHER PUBLICATIONS

Park, Choon Byong; Miller, Richard D.; Steeples, Don W.; and Black, Ross A. "Swept impact seismic techniques (SIST)." Geophysics. vol. 61, No. 6 (Nov.-Dec. 1996): P 1789-1803, 13 FIGs.

Borland, W.H.; Hayashida, N.; Kusaka, H.; Leaney W.S.; and Nakanishi, S. "Drill Bit Seismic, Vertical Seismic Profiling, and Seismic Depth Imaging to Aid Drilling Decisions in the Tho Tinh Structure Nam Con Son Basin—Vietnam." Butsuri-Tansa vol. 51, No. 1 (1998) p. 27-44.

* cited by examiner

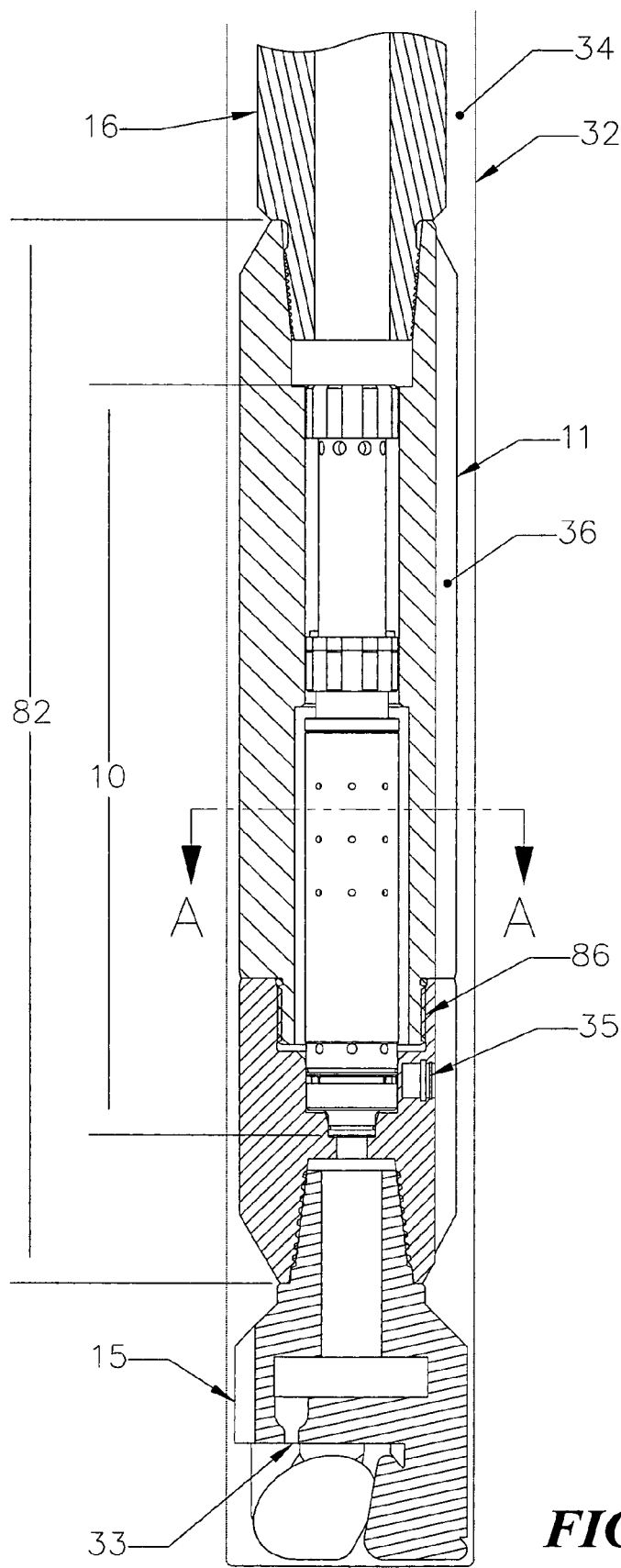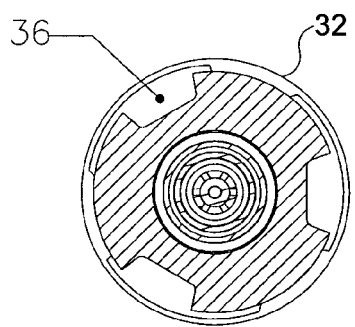
*FIG. 1A*
*FIG. 1B*

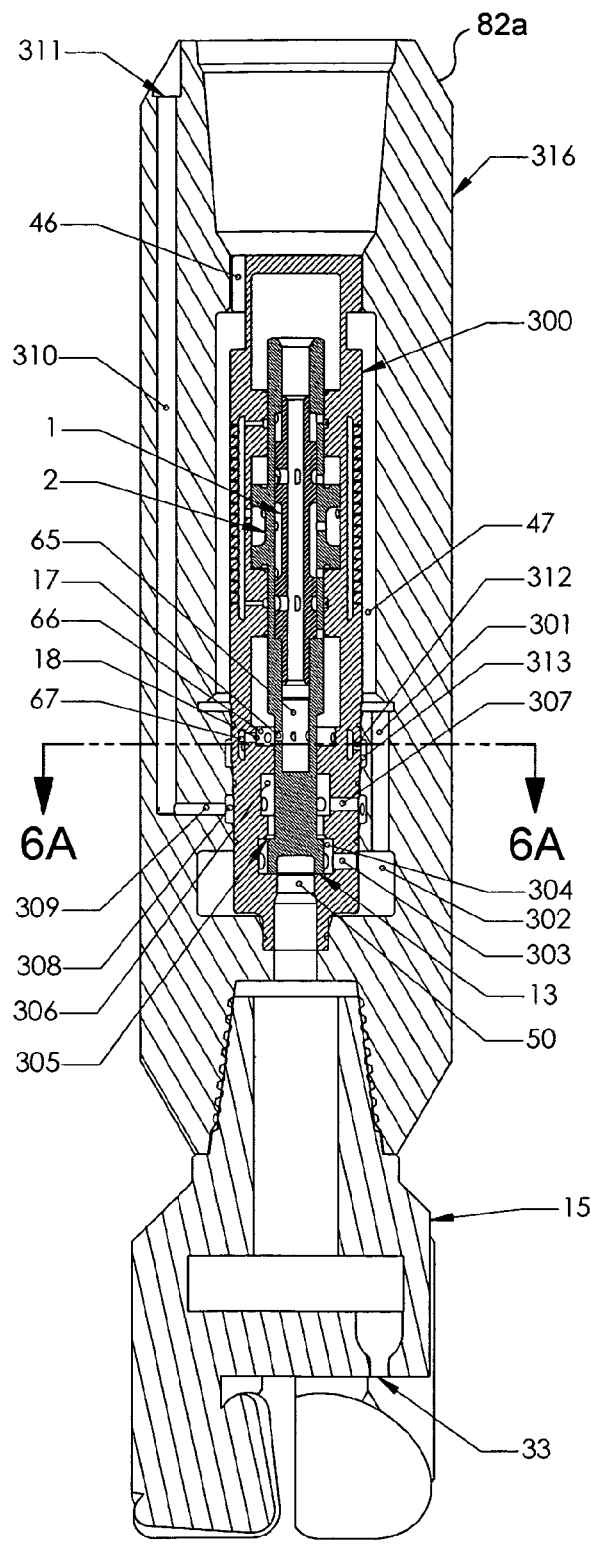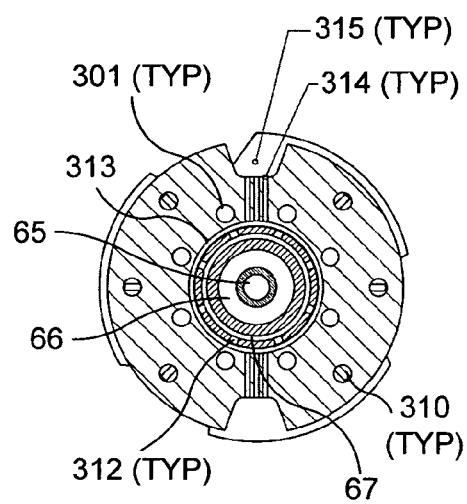
FIG. 6B
FIG. 6A

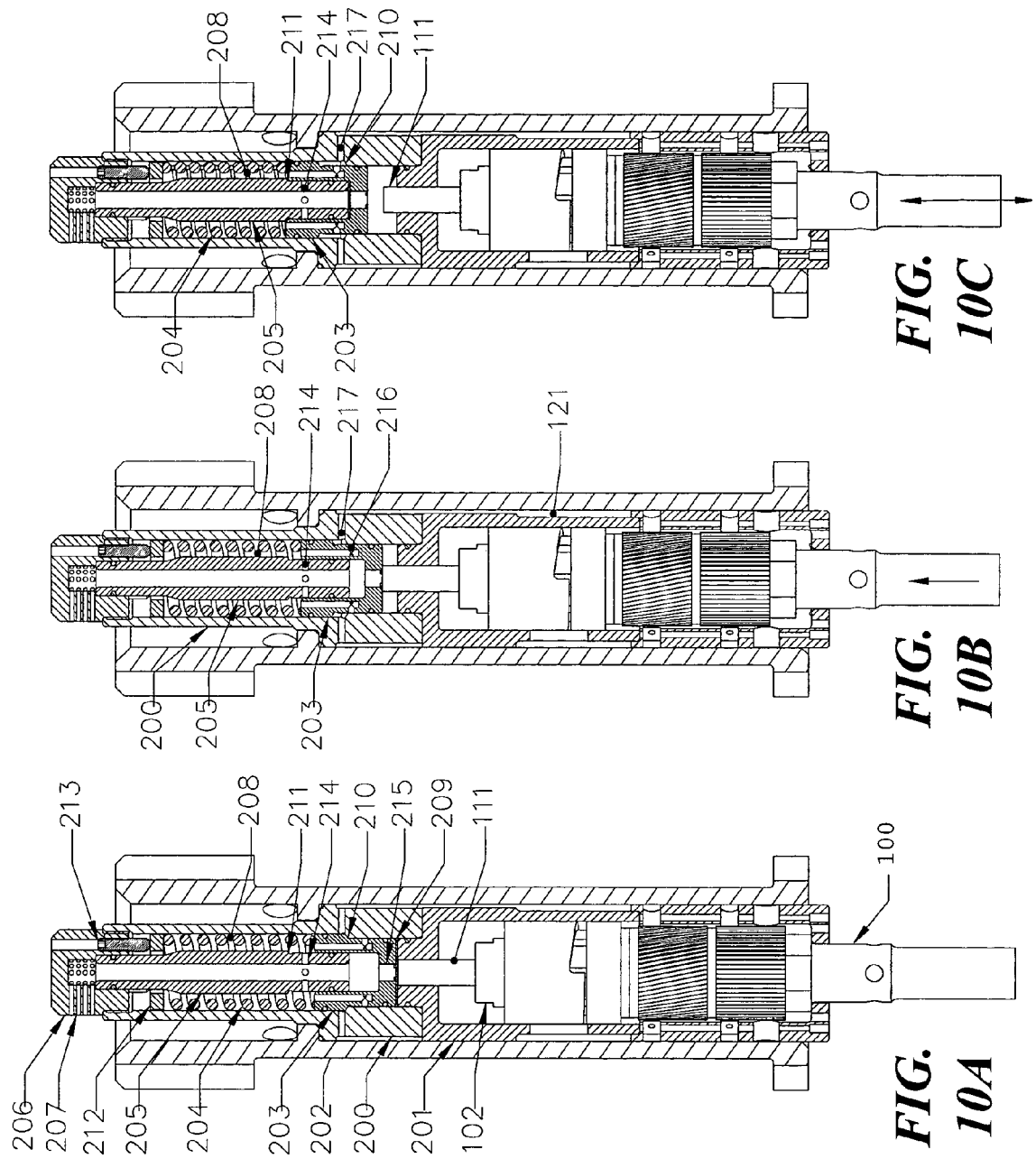

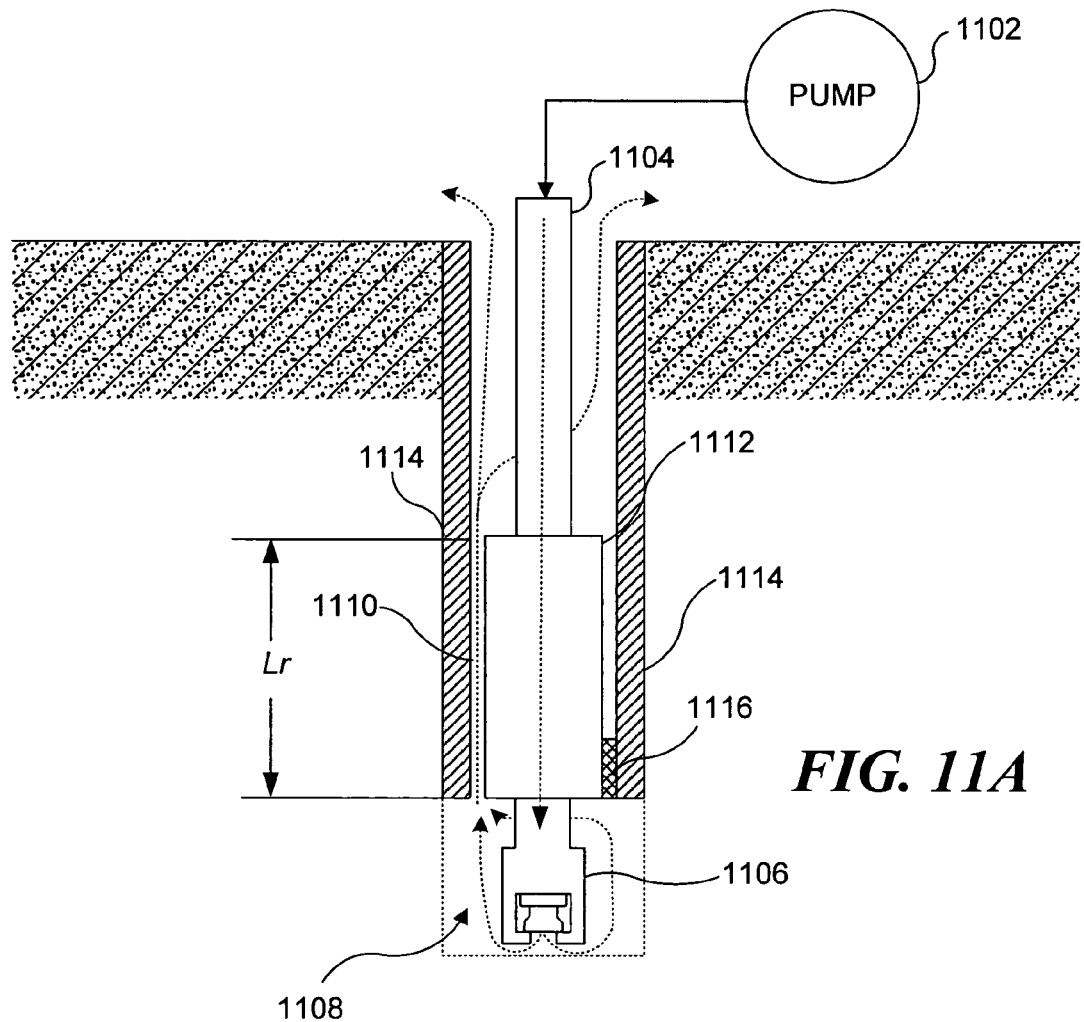
FIG. 11A
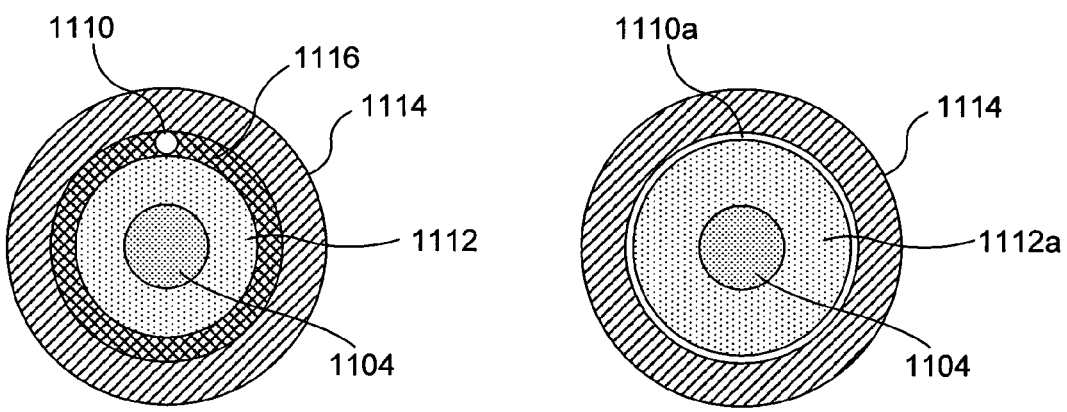
FIG. 11B          FIG. 11C

HYDRAULIC IMPULSE GENERATOR AND FREQUENCY SWEEP MECHANISM FOR BOREHOLE APPLICATIONS

GOVERNMENT RIGHTS

This invention was made with U.S. Government support under Contract Nos. DE-FC26-97FT34367 and DE-FG03-00ER83111 awarded by the Department of Energy, and the government may have certain rights in this invention.

FIELD OF THE INVENTION

This invention generally relates to an apparatus and a method for interrupting the flow of a fluid within a borehole, and more specifically, to a valve and to a method for interrupting the flow of a incompressible liquid (e.g., drilling mud) through a drillstring in a borehole to generate a negative pressure pulse, and to applications for the negative pressure pulse that is thus generated.

BACKGROUND OF THE INVENTION

Numerous references describe tools located above a drill bit in a drillstring for periodically interrupting all or most of the drilling fluid flow to the bit. These tools fall into three general categories, based on their intended application. In the first category are hammer drills that periodically divert drilling fluid flow to reciprocate the drill bit against the bottom of the borehole. This concept was first presented by Wolski in his 1902 U.S. Pat. No. 699,273. More recent developments in downhole hammers by SDS Pty. Ltd. and Novatek Inc. are described in U.S. Pat. No. 5,803,188 (McInnes, 1998); U.S. Pat. No. 5,396,965 (Hall et al., 1995); and U.S. Pat. No. 5,222,425 (Davies, 1993). The second category includes measurement-while-drilling (MWD) systems that interrupt fluid flow to the bit to generate mud pulses in the fluid column to facilitate telemetry signals transmitted from the downhole equipment to receiving systems on the surface. An early form of this type of system is described by Jakosky in U.S. Pat. No. 1,963,090 (1934). Many patents have been granted since then that utilize mud pulse telemetry in some form. The third category of tools interrupt flow to the bit causing pressure fluctuations in the borehole at the bit face that enhance drilling efficiency. It is clear that the third category of tool provides a substantial benefit, and it would be desirable to provide further apparatus and a method based on interrupting flow to the bit to generate pulses so as to enhance drilling efficiency.

The benefits of interrupting all or most of the drilling fluid flow to the bit for the purpose of creating pressure fluctuations or pulses in the borehole are well understood and are described in references such as those noted above. These benefits relate to the following points:

When the pressure below the bit rapidly decreases to less than the rock pore pressure, a brittle rock formation is encouraged to fracture due to the differential pressure across the surface of the borehole;

A reduced pressure below the bit produces a downward force on the bit that increases the load on the cutters, improving their cutting efficiency; and Rapidly changing pressures produce a "water hammer effect" or impulse that is transmitted to the drill bit and its cutters to also improve the cutting efficiency and fracturing of the rock by the bit.

The following list includes brief descriptions of some of the more significant patents that describe using drilling fluid pulses to enhance drilling.

1. In U.S. Pat. No. 3,648,789 (1972), Chenoweth describes a hydraulic pulse generator that uses a shuttle valve to direct drilling fluid either up and out to the annulus or down to the bit. The shuttle valve changes position rapidly due to "the pressure pulse waves generated in the passages between its upper and lower positions."
2. In U.S. Pat. No. 4,817,739 (1989), Jeter describes a "drilling fluid pulse generator for use above a drill bit to produce pulsations in drilling fluid flow." Jeter's pulse generator valve is auto-cycling at a frequency determined by a spring-mass system and the system pressure variations caused by the opening and closing of the valve.
3. In U.S. Pat. No. 6,053,261 (2000), Walter describes a flow pulsing tool that uses a spring-mass system wherein a poppet periodically blocks drilling fluid flow to the bit, creating pressure pulses above and below the valve that travel at the speed of sound in the fluid.

In each of the tools described in the above-noted references, oscillation of the pulse generator valve is caused by pressure fluctuations in the tool, usually enhanced by the action of a spring. Another class of pulse generator tool can be described as a pilot-operated poppet valve. In a pilot-operated valve, fluid drives a pilot valve that controls the action of a main poppet valve, which provides a more positive valve action that is self-starting and regulated by the timing of fluid ports in the valve. The use of this type of valve to produce negative pressure pulses in the borehole is described in commonly assigned U.S. Pat. No. 6,237,701 (2001), in which Kollé et al. describe various embodiments of a pilot valve/poppet valve based downhole hydraulic impulse generator for borehole applications, the disclosure and drawings of which are hereby specifically incorporated herein by reference. The primary benefits of the hydraulic impulse generator are associated with the rapid reduction in borehole pressure under the bit. The benefits of this negative pressure pulse for drilling as described in U.S. Pat. No. 6,237,701 include:

Increased rate of penetration;
Early identification of potential gas kicks;
Downhole seismic signal generation while drilling;

Additional applications of the negative pressure pulse in borehole applications other than drilling include:

De-scaling of tubulars; and
Formation cleaning.

The rapid reduction of borehole pressure that occurs in the invention described in this patent is accomplished by providing a flow of low compressibility fluid, such as water or drilling fluid, through a conduit in the borehole and momentarily blocking the fluid flow with a pilot-operated poppet valve that reciprocates between open and closed positions. If the poppet valve closes in a time that is equal to or shorter than the two-way travel time of an acoustic wave in the annulus between the conduit and borehole, a negative impulse pressure is generated in the borehole beneath the discharge of the conduit. The annular flow passage may be restricted to increase flow velocity in the annulus and increase the magnitude of the resulting negative impulse pressure. If the tool is used for drilling, the length of the restricted flow area may be limited to be less than 1.5 meters to reduce torque. In this case, the two-way travel time of an acoustic pressure pulse in the restricted flow annulus is about 2 milliseconds. The poppet must therefore close completely in less than 2 milliseconds for the tool to be completely effective. The poppet valve is dynamically unstable; when closed, it is energized to open, and when open, it is energized to close. A pilot spool directs drilling fluid to either side of the poppet spool to energize it. The pilot spool is also dynamically unstable. As the valve oscillates between open and closed positions, the passages in the poppet spool direct drilling fluid to either end of the pilot spool to energize it from one position to the other. The pulse generator valve self-starts from any position and runs at a frequency determined by the flow rate of drilling fluid through the valve mechanism.

One embodiment of the valve disclosed in U.S. Pat. No. 6,237,701 is incorporated in a drillstring within a housing including high speed flow courses. The valve closes in about one millisecond. Valve closure stops the flow of drilling fluid through the bit and through high speed flow courses in the housing around the bit. Stopping the upwards flow of drilling fluid through the flow courses generates a negative pressure pulse around the drill bit. This patent discloses that the valve closing time must be less than the two-way travel time of a pressure wave in the flow courses so that an intense negative pressure is generated below the bit. The valve disclosed in U.S. Pat. No. 6,237,701 can provide pulse amplitudes of from about 500 psi to about 1500 psi, with a cycle rate of from 15 to 25 times per second.

Although the relative locations of the pilot and poppet spools are not claimed with specificity in U.S. Pat. No. 6,237,701, a preferred embodiment described therein and early working models are configured with the pilot and poppet spools vertically in-line and physically separated from each other in interconnected housings. The in-line configuration requires multiple long intersecting passages to carry drilling fluid to and from the pilot and poppet spools. Transverse cross-port passages are required for interconnecting the various axial fluid passages. These cross-port passages are plugged from the outside to seal the internal pressure. Multiple sealing elements are required to seal the interconnecting fluid passages between housings.

While functional, the in-line configuration is extremely complex and is correspondingly difficult to manufacture and assemble. The housings are difficult to align, and the seal elements between the housings are prone to premature failure, particularly in the unforgiving environment associated with drilling operations. The long, interconnecting fluid passages and cross-drilled holes are subject to rapid erosion by the drilling mud at each change of flow direction. The valve is also subject to large pressure drops due to fluid friction through the long, complex passages. It would thus be desirable to provide a pilot valve/poppet valve based downhole hydraulic impulse generator for enhancing oil and gas drilling that does not suffer from the disadvantages of the embodiment described in U.S. Pat. No. 6,237,701.

Oil and gas casing and production targets are commonly determined by reference to seismic data. These data are conventionally obtained by conducting seismic reflection and refraction studies using surface sources such as vibrator trucks or air guns. Such sources create pressure waves in the earth that travel at different speeds, depending upon properties of the strata such as density and porosity. The vertical scale in a seismic image is measured in terms of seconds of travel time for the seismic waves. To be useful for planning drilling operations, these seismic images must be depth-corrected using assumptions regarding the velocity of seismic waves. The computed depth to a seismic target may differ from the actual depth by 20 percent or more.

If a well borehole is available in the vicinity of a seismic test, depth correction information can be obtained from a check shot survey, in which a seismic receiver is placed in the well and the travel time from a surface source to the receiver is observed. A vertical seismic profile (VSP) of velocity is obtained by moving the receiver to various depths in the well. A reverse vertical seismic profile (rVSP) provides the same information by placing the source in the well and a receiver on the surface. Conventional seismic profiling requires that drilling stop while the survey is carried out.

A tricone drill bit can provide the seismic source for rVSP in real time, allowing continuous depth correction of seismic profiles, as described by W. H. Borland in an article (Butsuri Tansa (1988) 51:1). Two seismic-while-drilling (SWD) systems, (Tomex from Baker-Atlas, and DBSeis from Schlumberger), rely upon the seismic energy generated by tricone bits, as described by J. W. Rector and B. P. Marion in "The use of drill bit energy as a downhole seismic source" (Geophysics (1991) 86:5). The bit creates acoustic noise as it bounces and scrapes against the rock. The acoustic signal is transmitted through the drillstring to the surface, where it is recorded by an accelerometer or other receiver. The drillstring signal is cross-correlated with signals received by geophones on the surface to create a seismic record. Current SWD techniques, which employ the drill bit as a source, provide seismic profiles that are helpful in detecting abnormal pressure trends, but do not provide a look-ahead capability. U.S. Pat. No. 5,191,557 (Rector et al., 1993) describes enhanced signal processing that is required to use a rig reference sensor with a drill bit seismic source for VSP and seismic imaging. While SWD systems can provide acoustic data while drilling, it would be even more desirable to provide a drill tool that can both enhance drilling performance and act as a seismic source during the drilling operation.

Drag bits (representing about 80 percent of offshore drilling) do not create a useable seismic signal, while tricone bits do not create a useful signal in soft formations. Furthermore, roller cone bits only produce a dipole radiation pattern along the axis of the drillstring, which limits the placement of seismic receivers to locations near the drill rig (a seismically noisy area due to pumps and other rig activity) and restricts the use of bit seismic techniques to vertical wells where the target formations occur in planes perpendicular to the borehole axis. It would be desirable to provide a drill tool that can both enhance drilling performance and act as a seismic source in which the seismic radiation pattern produced by the tool is not so limited.

Deep drilling operations are subject to blowouts when formation pressures become greater than the pressure of drilling fluids in the borehole. Methods for determining pore pressure ahead of the drill bit presently rely upon interpretation of seismic reflection data. Increased pore pressure causes a reduction in compression wave velocity, so VSP techniques can be used to identify abnormal pore pressure trends in a formation. This procedure also requires drilling to be stopped. SWD, using the drill bit as a source, has been attempted for imaging formations ahead of the bit. In many formations and under common operating conditions, tricone bits do not generate a signal-to-noise ratio that is usable for SWD. In particular, the drill bit seismic signal is limited to relatively low frequencies (under 80 Hz) and is incoherent, requiring significant post-processing. At a frequency of 80 Hz, the depth resolution in a 3 km/s formation is 37.5 meters (approximately four 9-meter joints of drill pipe), which is not useful to drillers.

Those skilled in the art will recognize that an ideal seismic source for profiling, reflection imaging, or refraction studies should be a point source and have a broad bandwidth. A broadband signal may be generated by a single impulse source, by sweeping a sinusoidal source over a broad range of frequencies, or by generating multiple impulses with a cycle period that varies over a full octave. It would be desirable to provide a drill tool that can both enhance drilling performance and act as a seismic source for SWD, providing a broad range of frequencies, to more readily facilitate the imaging of formations ahead of the bit.

The use of a swept impact seismic technique for surface applications using a mechanical impact tool with a variable cycle rate has been suggested in the prior art (Park, C. B., Miller, R. D., Steeples, D. W., and Black, R. A., 1996, Swept Impact Seismic Technique (SIST) Geophysics, 61 no. 6, p. 1789–1803). Varying the rate of a pure impulse signal over a full octave generates a continuous broadband signal. The received signal can be cross-correlated with the impact signal to generate a seismic record with high signal-to-noise ratio. The signal-to-noise ratio can be increased substantially by operating the source over a long period of time. U.S. Pat. No. 6,394,221 (Cosma, 2002) discloses a technique and apparatus for generating a swept impact axial or radial load at the bottom of a borehole using an electrically actuated hammer. This tool is designed to be clamped in a borehole at various depths for seismic profiling.

A number of references disclose variable frequency downhole seismic sources. For example, U.S. Pat. No. 4,033,429 (Farr, 1977) describes a drillstring with a sleeve containing a helical pattern of holes that periodically align with holes in the drillstring. Rotation and translation of the string through the sleeve create a signal that sweeps over a broad range of frequencies up to 80 Hz, depending on the drillstring rotation speed. Significantly, the apparatus described in the Farr patent requires an interruption in the drilling process to actuate the tool. U.S. Pat. No. 6,094,401 (Masak et al., 2000) describes the use of a downhole MWD mud pulse telemetry system to generate a sinusoidal frequency sweep over a range of frequencies from 1 to 50 Hz. Masak's device uses an electric motor to drive a rotor at variable rotation rates. The rotor interacts with a stator to restrict the mud flow to the bit. Restricting the flow generates axial shaking loads of up to 3000 lbf. These loads are transmitted through the bit to the formation. The coupling between the bit and the formation is limited by the relative axial stiffness of the drillstring and the reference discloses the use of a thruster subassembly to increase coupling. As with drill bit seismic, axial shaking of the drillstring generates primarily a dipole signal that propagates along the borehole axis. Seismic receivers must therefore be located near the drill rig, which is a source of substantial masking of seismic noise.

A number of options have been studied for generating a strong seismic signal while drilling. Most options involve stopping the drilling process to actuate a downhole source such as a piezoelectric vibrator, hydraulic or mechanical jarring tools, or dropping the drillstring. All of these options interrupt the drilling process and increase the potential for borehole instability. Frequent drilling interruptions would not be an acceptable practice for most operators.

Prior art SWD techniques result in low signal-to-noise ratios, and the resulting signals require substantial processing and interpretation. It would be desirable to provide a broadband high-amplitude SWD source that enables unambiguous real-time interpretation of formation velocity and reflections ahead of the bit.

SUMMARY OF THE INVENTION

A first aspect of the present invention is directed to a flow pulsing apparatus that generates negative pressure pulses of substantial magnitude downstream of at least a partially interrupted fluid flow within a conduit. Preferably, the at least partial interruption of fluid flow occurs without generating an upstream positive pressure pulse or water hammer pulse associated with prior art flow pulsing apparatus. In at least one embodiment, the upstream positive pressure pulse is avoided by providing a valve configuration that enables an incompressible fluid to continually flow into the valve through an inlet port and subsequently flow from the valve through an outlet port or through a drain port that empties into the conduit above the valve. The rapid reduction or total interruption of flow of the pressurized fluid through the valve outlet produces the negative pressure pulse.

The valve includes a first member configured to be actuated by the pressurized fluid to cycle between an open position and a closed position, such that when in the closed position, the first member at least partially interrupts the flow of the pressurized fluid through an outlet. The valve also includes a second member that is disposed within the first member. The second member is configured to be reciprocated back and forth between first and second positions during each cycle by the pressurized fluid, such that a position of the second member controls the timing of the valve. Preferably, the first and second member are disposed coaxially. Because the second member is disposed within the first member, flow paths between the first and second member are extremely short and direct.

The first member is fitted with bushings at each end to capture the second member and to limit its travel inside the first member. The first member travels axially inside of two end rings, disposed near each end of the first member. As the first and second members travel from one position to the next, fluid passages within the valve are opened and closed by grooves and openings in the first and second members. The size and location of the openings and grooves control the timing of the valve. In at least one embodiment the entire valve mechanism is housed in a single cartridge that is installed with a stab-type seal in a special housing above a bit. The cartridge can be configured to include fluid channels that enable at least a portion of the interrupted flow of fluid to be diverted back up the drillstring, to reduce a water hammer effect. The larger the volume of the flow of pressurized fluid that is diverted, the greater the reduction in the water hammer effect that is achieved. In some applications, the water hammer effect is beneficial, and thus, the present invention encompasses both embodiments in which fluid channels are configured to divert sufficient pressurized fluid so that the water hammer effect is substantially minimized, and embodiments in which little or no pressurized fluid is diverted, so that the water hammer effect is not substantially reduced.

Optionally, a pressure actuated on/off mechanism can be coupled with the valve. In this embodiment, the valve does not begin operating until a predetermined pressure has been obtained within the conduit.

The pressure pulses generated by the valve can be used in a number of ways. In drilling operations, the pressure pulses enhance drilling operations by providing a force that drives the bit into the bottom of the borehole. The pressure pulses also momentarily reduce bottom hole pressures, to aid in weakening the rock face. One embodiment of the invention includes a frequency modulator that is coupled with the valve. The frequency modulator is configured to change the timing of the valve based on a repeating pattern. The pressure pulses produced by the valve thus sweep over a range of frequencies. The pattern of the pressure pulses is distinctive, such that pressure pulses and seismic waves associated with the pulses produced by the valve can be readily separated from other sources of acoustic energy.

The ability of the present invention to sweep the frequency of the pulse valve described herein over a range enables true look-ahead SWD and rVSP operations to be achieved. The frequency modulator repeatedly varies (sweeps) the pressure pulses to produce a range of pulse periods. Different embodiments of a method for processing the swept impulse seismic signal for profiling seismic wave velocity and reflection imaging are disclosed.

The frequency modulator controls the cycle rate of the valve modifying the rate of one of the strokes of the second member of the valve. By dampening a single stroke of the second member of the valve, the frequency modulator causes the first member of the valve to remain open longer than it would otherwise. Preferably, the frequency modulator employs a variable volume coupled with a shaft. The shaft is configured to force fluid out of the variable volume when the shaft engages the second member of the valve. The travel time required for the shaft is determined by the size of the variable volume. Changing the size of the variable volume thus changes the travel time of the shaft, which in turn, changes the travel time of the second member as it engages the shaft.

The frequency modulator preferably includes a rotary indexing mechanism that changes the size of the variable volume each time that the second member engages the shaft. After one complete revolution of the indexing mechanism, the frequency sweep repeats.

The period of the sweep is determined by the number of indexer steps per revolution and the time of the undamped strokes. To be effective, the range of frequencies should preferably cover approximately one octave, and the period of each successive pulse should vary linearly with time until the frequency sweep is completed. These characteristics are controlled mainly by the shape of the variable volume orifice.

With the optional on/off mechanism attached, the pulse valve and the frequency modulator are activated and deactivated from the surface by varying the drilling fluid flow rate and, therefore, its pressure. When the pressure drop across the pulse tool and bit exceeds a predetermined "start" value, the valve begins cycling, and the frequency modulator starts sweeping. When the pressure is reduced substantially below the start value, the valve stops cycling and remains in the open position until the pressure is again raised above the start value.

The pulse valve of the present invention has the following advantages and related benefits over the pulse valve disclosed in U.S. Pat. No. 6,237,701;

1. no long, interconnecting fluid passages, cross-ports, or plugs, resulting in greatly simplified construction and much lower manufacturing and maintenance costs;
2. no troublesome housing seals between poppet and pilot, providing increased reliability;
3. fewer sites for erosion resulting in longer life;
4. reduced pressure drop of flow through the valve, yields more flow that is available for bit and impulses resulting in improved drilling;
5. physical interaction between the poppet and pilot reduces potential for sticking, resulting in increased reliability;
6. unitized cartridge construction enables easy removal and servicing, and resulting in lower operational costs;
7. unitized cartridge construction enables wire-line retrievability and makes the device safer for use downhole;
8. compact arrangement and shorter overall length providing less impact on BHA design;
9. easy to alter the timing by minor changes in the location and/or size of flow passages, providing greater flexibility for various applications; and
10. easy to scale up or down providing greater flexibility needed for various applications.

The frequency modulator of the present invention has several advantages and related benefits over prior art seismic source apparatus and methods. For example, the frequency modulator and pulse valve combination provide a seismic source independent of the drill bit employed. Thus, the combination can produce a useable seismic signal when employed with polycrystalline diamond compact (PDC) bits.

The pulse valve produces an omni-directional radiation pattern, making it particularly attractive for deviated wells and horizontal drilling, where SWD data can be critical for bit steering applications. By contrast, a bit source focuses P-wave energy along the drillstring axis and is therefore of limited utility for deviated and horizontal wells.

The seismic signal produced by the pulse valve of the present invention is highly coherent, since it originates at the point where the bit meets the end of the hole when the pulse valve is disposed on the drillstring proximate the drill bit. This configuration enables higher resolution geological data to be obtained.

The frequency modulator functions continuously while the pulse valve is operating and can be fitted with the optional pressure controlled on/off mechanism to prevent the pulse valve from cycling until a preset pressure is reached.

The pulse valve/frequency modulator combination can be implemented as a purely hydraulic-mechanical device that is powered by the drilling fluid normally used in drilling operations. No other energy source or control logic is required. Also, no downhole electronics, programming, gears, or electric motors are required, although the use of such systems is not precluded.

True SWD functionality can be achieved and tripping or interruption of operations is not required to obtain data. Other seismic sources require drilling operations to be interrupted to obtain seismic data. In many hard rock formations, the pressure pulses generated at the bit will enhance drilling operations by increasing drilling rate and reducing improper bit motions such as stick-slip, and whirl.

Unlike bit sources, the seismic signal generated by the present invention comprises discrete pulses that vary in frequency in a regular pattern. Since the source can be operated continuously, data can be stacked to enhance signal-to-noise ratio.

The frequency modulator preferably has the same cross-sectional size as the pulse valve and is accommodated in a common cartridge housing. Such a cartridge is easy to install and remove from an adapter sub housing disposed directly above the bit in a drillstring. In some applications, it may be advantageous to wire-line install or retrieve the cartridge through the drillstring without pulling the string from the borehole, and this option can be employed with the present invention.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein:

FIG. 1A is a partial section view that shows the relationship of the hydraulic impulse generator in accord with a first aspect of the present invention to a bottom-hole-assembly (BHA) of a drillstring;

FIG. 1B is a cross-sectional view taken along section line A—A in FIG. 1A;

FIG. 6A is a partial section view of an alternative configuration of the pulse valve of the present invention, which has been specifically configured to divert fluid flow during operation of the pulse valve, to substantially reduce a water hammer effect associated with the interruption of a flow of fluid;

FIG. 6B is a cross-sectional view taken along section line 6A—6A in FIG. 6A;

FIG. 10A is a partial section of the on/off mechanism of the frequency modulator of FIG. 7A, shown in the off position holding open the poppet spool of the pulse valve of FIGS. 5A–5D;

FIG. 10B is a partial section of the on/off mechanism of the frequency modulator of FIG. 7A, shown moving to the on position, as system pressure is increased;

FIG. 10C is a partial section of the on/off mechanism of the frequency modulator of FIG. 7A shown in the on position, so that the poppet spool of the pulse valve of FIGS. 5A–5D can cycle unimpeded;

FIG. 11A shows the hydraulic impulse generator in accord with the first aspect of the present invention being used for well stimulation;

FIGS. 11B and 11C are cross sectional views of a well showing relative locations of fluid delivery tubing and a flow restriction enabling fluid to circulate back to the surface;

Figure 15:
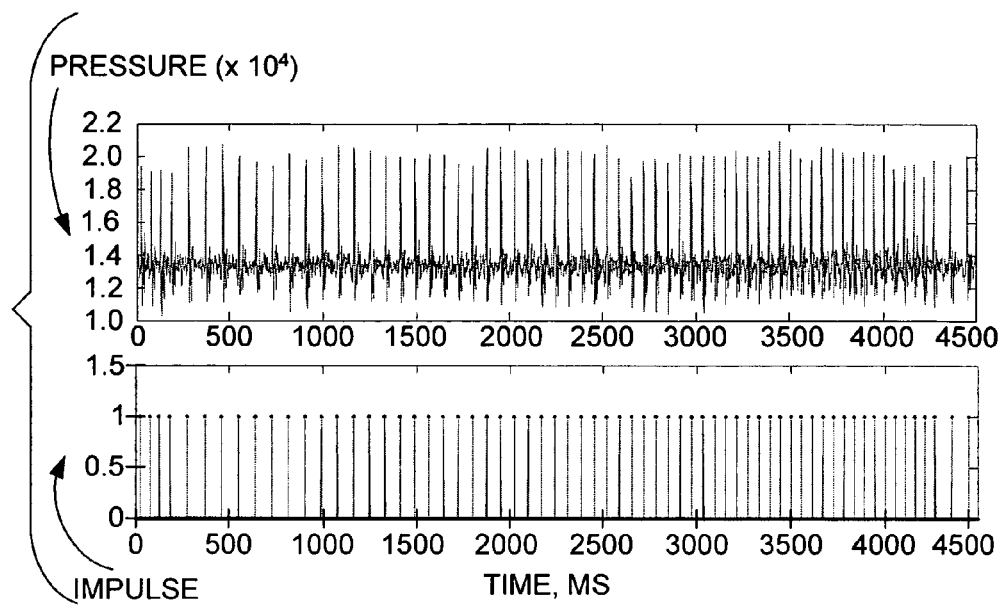
Figure 16:
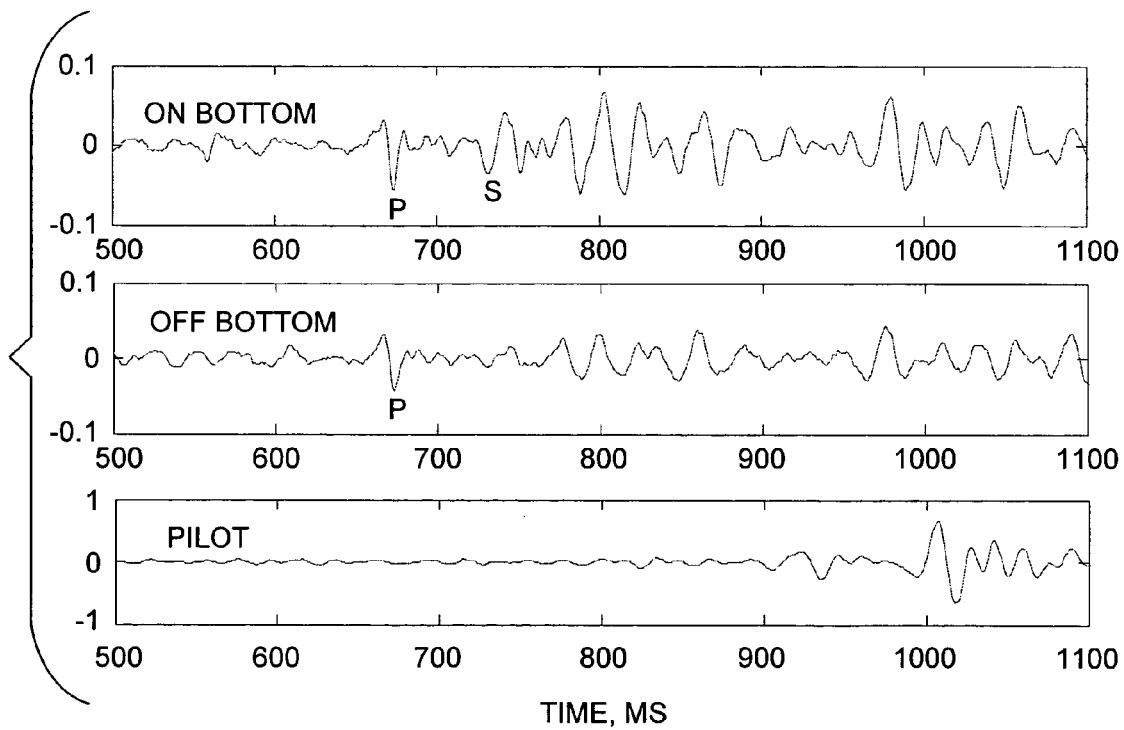

FIG. 15 illustrates two graphs showing a pipe/pilot pressure signal that has been converted to an impulse timing function, with negative pressure pulses around the bit shown in a lower graph, and upstream pressure pulses at the top of the tool shown in an upper graph; and FIG. 16 illustrate three graphs showing a cross correlation of the impulse timing function of FIG. 15, the cross correlation averaging a transmitted pulse signal with a phase delay proportional to a difference in a travel time of a pipe/pilot wave and waves propagating through the earth, wherein a lower graph illustrate the pipe/pilot wave, a middle graph illustrates pressure waves generated with the tool off the bottom of the borehole, and an upper graph illustrates pressure and shear waves generated with the tool on the bottom of the borehole.

DESCRIPTION OF THE PREFERRED EMBODIMENT

The present invention is both an improved hydraulic impulse generator and a frequency modulator that is usable with the hydraulic impulse generator to enable a broad range of frequencies to be generated during drilling, to achieve SWD with look ahead imaging. The text that follows first describes the improved hydraulic impulse generator and then describes the frequency modulator that can be used with the improved hydraulic impulse generator to achieve SWD. As noted above, an earlier design of a hydraulic impulse generator is described in commonly assigned U.S. Pat. No. 6,237,701, issued on May 29, 2001. The present invention corrects several problems with this earlier design, as discussed above under the Background of the Invention.

FIGS. 1A and 1B show the basic configuration of the improved hydraulic impulse generator, which is disposed at the bottom of a rotary drillstring 16. A hydraulic impulse generator 82 is part of a BHA of rotary drillstring 16, which is disposed in a borehole 32. Drilling fluid, under pressure from one or more pumps (not shown) on the surface, flows down through the drillstring to a bit 15, which is disposed adjacent to the distal end of the drillstring. Although a tricone bit is illustrated, other types of bits may also be used with satisfactory results. Orifice 33 in the bit releases the pressurized drilling fluid into borehole 32. The drilling fluid is used to lubricate and cool the bit, and to carry the cuttings up to the surface through an annular volume 34 defined between the drillstring and the inner surface of the borehole. To be effective, hydraulic impulse generator 82 must be disposed directly above bit 15, so that substantially all the flow of the pressurized drilling fluid to the bit passes through the hydraulic impulse generator.

Figure 3:
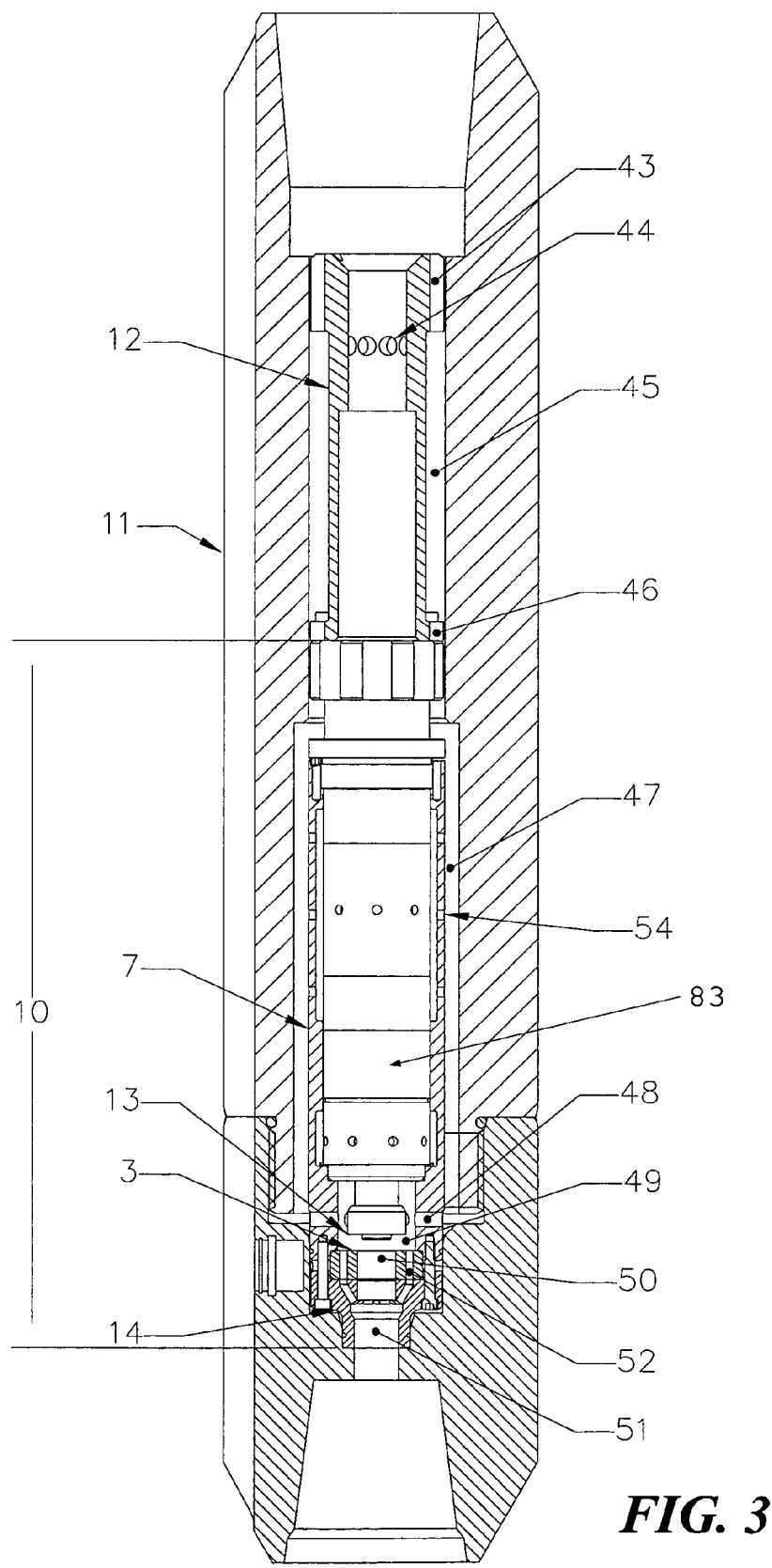
FIG. 3 is a partial section view that shows primary flow passages in the hydraulic impulse generator in accord with the present invention.

About 90 percent of the drilling fluid flow that enters hydraulic impulse generator 82 actually goes directly to the bit and is referred to as the "primary flow." The other 10 percent of the flow is used to actuate the impulse generator and is referred to as the "secondary flow." The flow path for the primary flow can be clearly seen in FIG. 3, while FIGS. 4A–4D relate to the secondary flow that activates the impulse generator of the present invention. FIGS. 3 and 4A–4D are discussed in detail below. After actuating the impulse generator, the secondary flow is discharged directly to borehole 32 through drain ports 35 above bit 15. Note that while only a single port 35 is shown in the cross section of FIG. 1A, it should be understood that a plurality of ports 35 can be, and preferably are, distributed about the circumference of hydraulic impulse generator 82. Preferably, hydraulic impulse generator 82 is configured as a valve cartridge assembly 10 that is disposed within a housing 11. The housing is equipped with American Petroleum Institute (API) threaded joints to connect the hydraulic impulse generator to drillstring 16 above, with drill bit 15 disposed below the hydraulic impulse generator. Housing 11 is formed of two half shells joined by a threaded and sealed connection 86. Fabricating housing 11 out of multiple portions simplifies the machining required to achieve the precision features (annular volumes and fluid passages, as will be described in detail below) included within the housing. Optional blades (see FIG. 1B) on the outside of housing 11 form multiple flow course channels 36 that increase the velocity of the annular flow up from bit 15 between the outer surface of the housing and borehole 32. The abrupt change of velocity in this annular flow, which occurs when a poppet valve in valve cartridge assembly 10 closes, causes a negative pressure spike in the borehole around the bit. The negative pressure spike enhances drilling by pulling the bit into the formation and by relieving chip hold-down pressure resulting from overbalanced drilling (i.e., where the pressure exerted by the weight of drilling fluid in the borehole exceeds the formation pore pressure). Relieving chip hold-down pressure encourages formation particles fractured by the bit to break away from the surface of the formation and be carried away by the drilling fluid. Increasing the fluid velocity around housing 11 increases the magnitude of the negative pressure spike, resulting in faster material removal and faster drilling.

It is important to understand that negative pressure pulses can be generated by only partially closing the poppet valve within hydraulic impulse generator 82, so that the flow of pressurized fluid through orifice 33 is rapidly substantially reduced, but not totally interrupted. However, the magnitude of the resulting negative pressure pulses will be less if the poppet valve does not completely arrest the flow of pressurized fluid downstream of hydraulic impulse generator 82 compared to the magnitude of the negative pressure pulses produced when the poppet valve completely closes.

Negative pressure pulses enhance drilling performance in several ways. A hydraulic thrust acts on the drill bit, increasing the force with which it contacts the rock face. Furthermore, if the magnitude of the negative pressure pulse is sufficiently great, i.e., over 500 psi, the differential pressures generated by the negative pressure pulses will weaken the rock face. The pulsing action of the drilling fluid at the rock face when negative pulses are generated greatly improves the ability of the drilling fluid to remove cuttings and debris from the rock face.

Changes to the invention shown in FIGS. 1A and 1B are readily envisioned. Although hydraulic impulse generator 82 in FIG. 1A is shown disposed adjacent a drill bit for use at the bottom of a borehole, different configurations can be employed in which the flow interruption valve is disposed at other locations in a borehole. For example, the hydraulic impulse generator can be disposed at various positions selected so that the negative pressure pulses generated by the valve can be employed to descale tubulars, to remediate formation damage, to remove fines, or to generate seismic pulses. Details of these different configurations are discussed below.

Cartridge Assembly

Figure 2A:
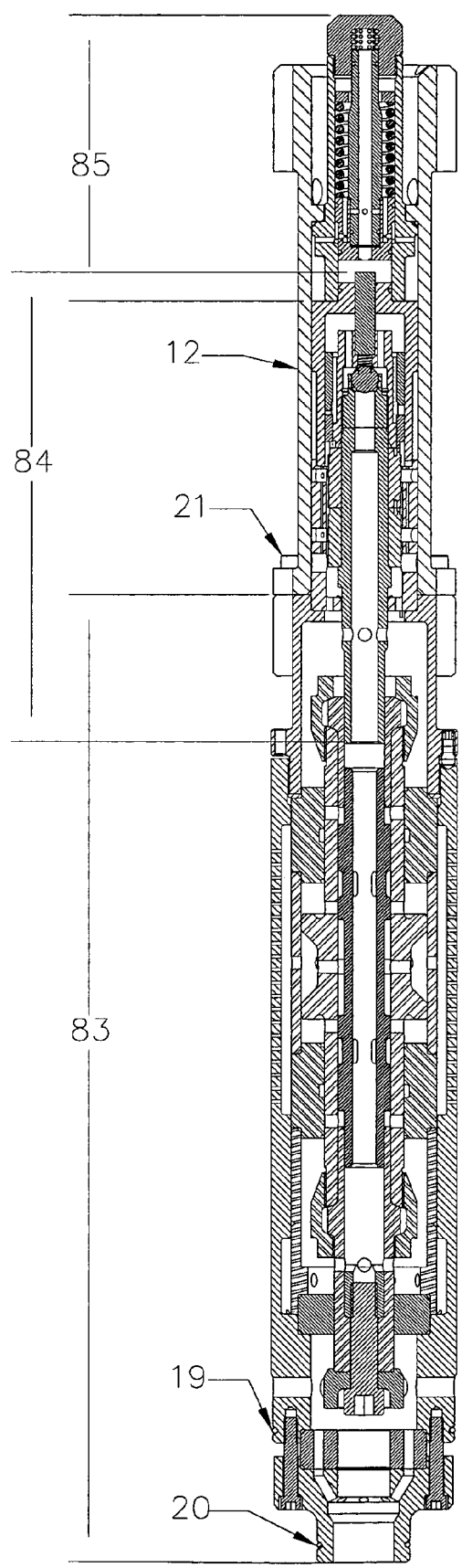
FIG. 2A is a cross-sectional view that shows components of a cartridge assembly implementing both a first and second aspect of the present invention.

FIG. 2A illustrates components in cartridge assembly 10. The cartridge assembly is configured to be readily installed and removed from housing 11 as a unit from above, when drillstring 16 is disconnected. The cartridge assembly includes a poppet valve 83 (a key component of hydraulic impulse generator 82), an optional frequency modulator 84, and an optional on/off mechanism 85 for controlling the frequency modulator. A modulator housing 12 contains the optional frequency modulator and on/off mechanism. Modulator housing 12 is attached to the top of poppet valve 83 with fasteners 21. When frequency modulator 84 and on/off mechanism 85 are not used, modulator housing 12 remains empty, taking up space in housing 11 to facilitate installation and removal of cartridge assembly 10. Seals 19 and 20 at the bottom of poppet valve 83 ensure separation between the primary and secondary flows.

Poppet Valve

Figure 2B:
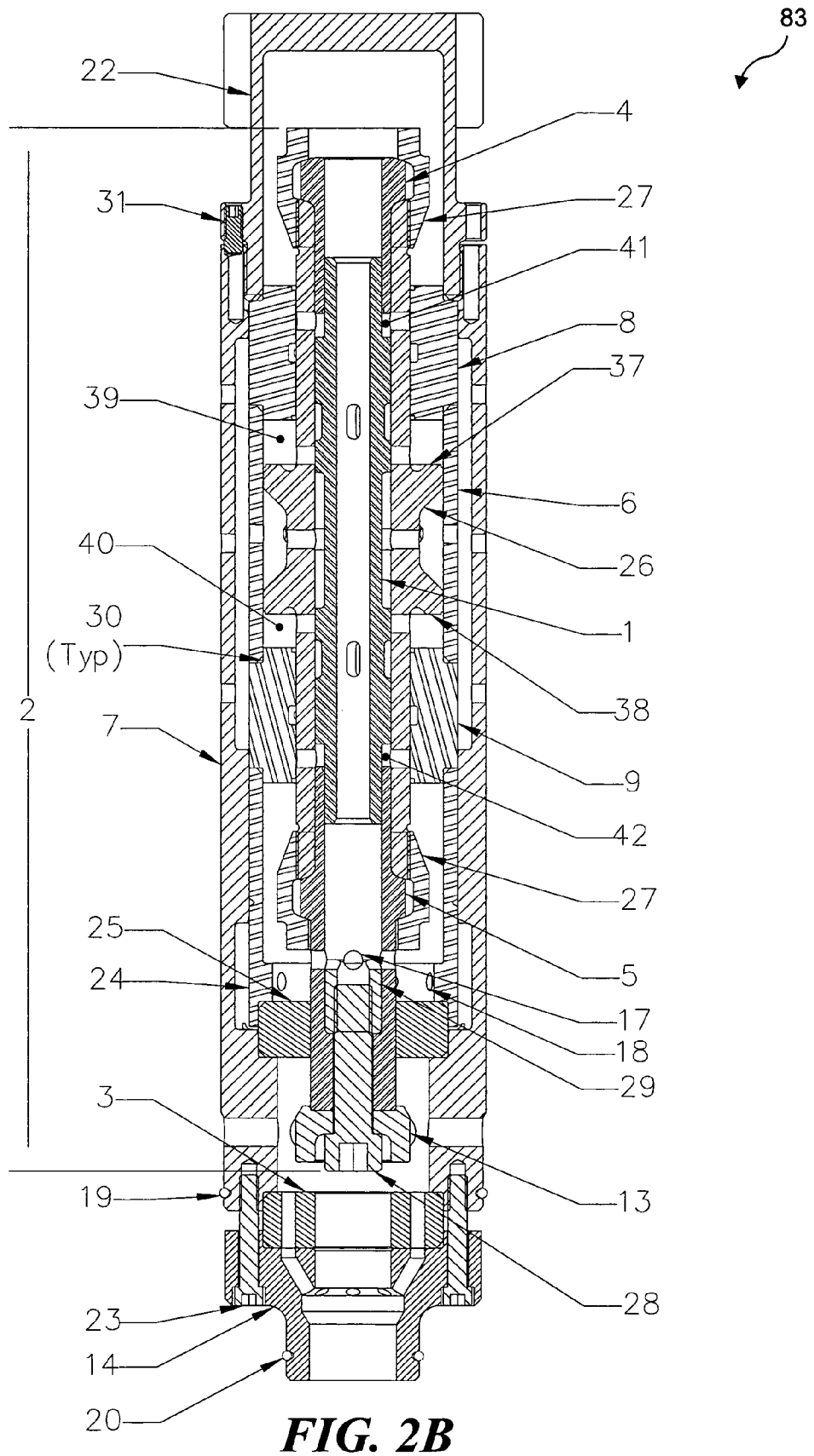
FIG. 2B is a cross-sectional view that shows components of a preferred pulse valve design, including both a pilot spool and a poppet spool suitable for use in the first and second embodiments of the present invention.

FIG. 2B illustrates the components of poppet valve 83, which has three layers, an outer shell, inner stationary parts, and internal moving components. The outer shell includes (from top to bottom) an end cap 22, a clamp ring 7 threaded together with blind end cap 22, a poppet seat 3, and a poppet seat retainer 14 that is coupled to the poppet seat by a plurality of fasteners 23.

The inner stationary components include (from top to bottom) an upper end ring 8, a cylinder 6, a lower end ring 9, a front spacer 24, and a seal ring 25, which sits on a shoulder on the interior of clamp ring 7. Seal ring 25 guides the lower end of poppet assembly 2 and separates the primary flow from the secondary flow (described in greater detail below). Threaded blind end cap 22 pushes down on upper end ring 8, compressing the inner stationary components and stretching clamp ring 7 to hold all components tightly. The required amount of preload is determined by the operating loads and material properties in a specific application of the present invention. The preload is set by adjusting the end cap thread engagement. End cap 22 is prevented from unscrewing by a set screw 31 that engages one of several counter-bored pockets in the top of clamp ring 7.

Inside the inner stationary components are the moving components, including a poppet assembly 2 and a pilot spool 1. Poppet assembly 2 includes a poppet 26 with a pilot bushing 4 pressed into its upper end bore and a poppet bushing 5 pressed into its lower end bore. The pilot bushing and poppet bushing are further secured in place by bushing retainers 27, one of which is disposed at each end, and which are threaded onto the ends of poppet 26. This configuration allows quick disassembly of the apparatus to install and remove pilot spool 1. Attached to the lower end of poppet bushing 5 is a poppet ring 13 that is secured by a socket head cap screw 28 from below and by a castellated nut 29 that is inside the poppet bushing. The castellations on nut 29 enable it to be held with a rod through openings 17 and 18 in poppet bushing 5 and front spacer 24, while screw 28 is tightened. In a current preferred embodiment, poppet assembly 2 is free to move axially between upper end ring 8 and poppet seat 3. Pilot spool 1 is disposed and captured within poppet assembly 2 and is captured by pilot bushing 4 above and poppet bushing 5 below. In this embodiment, the pilot spool is free to move axially in the poppet between bushings 4 and 5. Preferably, elastomeric O-rings 30 provide sealing between components.

Poppet Assembly Motion

Poppet assembly 2 reciprocates back and forth axially to open and close poppet valve 83. When poppet ring 13 is in contact with poppet seat 3, the valve is closed. Two poppet flanges 37 and 38, together with end rings 8 and 9, and cylinder 6, define two variable volumes. Variable volume 39 is defined by end ring 8 and poppet flange 37, while variable volume 40 is defined by end ring 9 and poppet flange 38. Pressurized fluid entering and leaving variable volumes 39 and 40 cause poppet 26 (and poppet assembly 2) to reciprocate. The pressurized fluid is shuttled between these annular volumes by pilot spool 1 as described in detail below.

Pilot Motion

Captured inside poppet assembly 2 is pilot spool 1, which itself reciprocates independently between poppet bushing 5 below and pilot bushing 4 above. The pilot spool is energized by fluid flow entering variable volumes 41 and 42, which are defined by pilot spool 1, poppet 26, pilot bushing 4, and poppet bushing 5. Pressurized fluid flow entering and leaving variable volumes 41 and 42 moves the pilot back and forth. Ports in poppet 26 and end rings 8 and 9 (the end ring ports are not visible in this view) shuttle fluid to either variable volume 41 or variable volume 42 as described in more detail below. Since the motion of the pilot spool is within poppet 26, the pilot spool's motion relative to the cartridge is the sum of its motion relative to poppet 26 plus the motion of poppet 26.

The secondary flow to and from poppet variable volumes 39 and 40 and pilot variable volumes 41 and 42 is controlled by the location and size of ports in poppet 26, pilot spool 1, and end rings 8 and 9. As poppet assembly 2 and pilot spool move, fluid is displaced from the opposite cavity. The displaced fluid exhausts to borehole 32 through various ports, as described in detail below.

Primary Flow Path

FIG. 3 shows the primary flow path through the hydraulic impulse generator. Drilling fluid flowing down from the drillstring from above enters the impulse generator through slots 43 and holes 44 in modulator housing 12 (which may optionally contain the frequency modulator, as noted above). All fluid flow passes through annular volume 45 and through axial grooves 46, to annular volume 47. Primary flow (~90 percent) passes from annular volume 47 (passing around the exterior of cartridge assembly 10) enroute to the drill bit (see FIG. 1A) through holes 48 in clamp ring 7 to a volume 49 disposed above poppet seat 3. Depending upon position of the poppet valve, flow is either blocked by poppet ring 13 or continues through a central primary flow port+in poppet seat 3. From poppet seat 3, the primary flow passes through a central port 51 in poppet seat retainer 14 and on to the drill bit (i.e., bit 15, shown in FIG. 1A).

Poppet seat 3 can optionally be equipped with additional ports 52 around primary flow port 50. These holes remain open even when poppet valve 83 is fully closed. Fluid flow through these holes bypasses poppet valve 83 and continues circulating in the unlikely event that the hydraulic pulse valve fails in the closed position. These holes also enable the drillstring to drain while tripping out. However, the bypass fluid flow through the holes reduces the magnitude of the beneficial negative pressure spike below the bit. The bypass fluid flow can be reduced by installing one or more plugs (not shown) in bypass ports 52 or by using a poppet seat that does not include bypass ports. When no bypass ports are employed, alternative means should be provided for protecting the fluid system in the event that the hydraulic pulse valve fails in the closed position. For example, a safety relief sub with a ruptured disk or other pressure sensitive device (not separately shown) can be installed above hydraulic pulse valve housing 11. The relief setting should be higher than the internal positive pulse peak pressure generated by the closing of poppet valve 83.

Secondary Flow Path

As noted above only approximately 10 percent of the fluid volume pumped down the drillstring is required to energize poppet valve 83. This volume is referred to as the secondary flow of fluid. Secondary flow does not pass through the bit at the end of the drillstring, but instead discharges directly into the borehole after passing through the valve mechanism. Secondary flow enters the mechanism through multiple small inlet openings 54 (see FIG. 3) in clamp ring 7. The small inlet holes prevent larger particles that are carried through the valve by the drilling fluid from entering the secondary flow path and possibly jamming the valve mechanism. The primary flow (the other 90 percent of the fluid volume) moving along the outside of clamp ring 7, provides a shearing action that helps to clean away particles that could block inlet openings 54. All ports in the valve mechanism downstream of inlet openings 54 are larger than the inlet holes so that all particles that pass through the small inlet openings are flushed away through the valve mechanism to the borehole through the discharge ports (i.e., through ports 35, which are shown in FIG. 1A).

Poppet Valve Actuation

Action of the valve mechanism can be broken down into four strokes that repeat continuously. A detailed description of how fluid flows through the mechanism and the effect that flow has on the movement of poppet assembly 2 and pilot spool is provided below in conjunction with FIGS. 4A, 4B, 4C, and 4D, which are simplified centerline sections of the pulse valve cartridge that enable the flow passages to be more clearly visible. It should be understood that poppet assembly 2 has been somewhat simplified, such that the individual components of poppet assembly 2 are not shown separately. Those individual components, which include pilot bushings 4 and 5, upper and lower bushing retainers 27, poppet 26, cap screw 28, and poppet ring 13, are shown and fully described in conjunction with FIG. 2B. Similarly, the outer member of FIGS. 4A–4D is simplified for clarity. Before discussing FIGS. 4A–4D in detail, it may first be advantageous to summarize the function and operation of the valve.

The basic operation of the valve creates powerful pressure pulses by rapidly momentarily interrupting the flow of a fluid (such as drilling fluid) in a conduit in a repetitive manner. The flow interruptions are created by a pilot-operated poppet valve, which in one embodiment oscillates at a constant frequency, and in another embodiment oscillates at a variable frequency in a repeating pattern when an optional frequency modulator is disposed upstream of the valve. The poppet valve uses a portion of the pressurized drilling fluid, i.e., approximately 10 percent in a preferred embodiment, to power the valve. The fluid is directed to either side of the poppet by the pilot spool, which is disposed internal to and coaxial with the poppet. The pilot shifts hydraulic flow from one side of the poppet to the other, causing the poppet to reverse directions.

The porting of fluid through the valve is arranged so that the poppet is dynamically unstable. When closed, the poppet valve is energized to open. When open, the poppet valve is energized to close. As the poppet valve oscillates between open and closed positions, fluid passages in the poppet direct drilling fluid to either end of the pilot to energize it from one position to the other. The porting is arranged so that the pilot is also dynamically unstable. As the poppet and pilot spool travel toward one end, fluid is displaced from the opposite end. This fluid is discharged through drain ports to the ambient pressure of the borehole. Because the poppet and pilot are dynamically unstable, the poppet valve self-starts from any position as soon as pressure is applied with the drilling fluid.

The poppet valve of the present invention operates in four strokes. In this description, movements of components are described as "up" and "down," but it should be understood that these movements are relative to the valve outlet, such that "up" is away from the outlet and "down" is toward the outlet. There is no inherent requirement that the operation or orientation of the valve be constrained in the more general sense, in which up and down refer to a vertical orientation. The four strokes of the poppet valve are as follows:

1. the poppet travels down, blocking drilling fluid flow and opening ports to drive the pilot spool down;
2. the pilot spool travels down, opening ports to drive the poppet up;
3. the poppet travels up, opening the valve and opening ports to drive the pilot spool up; and
4. the pilot travels up, opening ports to drive the poppet down.

This four stroke cycle repeats automatically at a fixed frequency determined mainly by the geometry of the valve and the pressure drop across the valve. As noted above, and as described in greater detail below, an optional frequency modulator can be incorporated to regularly vary the frequency, so that pressure pulses propagating into the surrounding formation from the valve can be collected and analyzed to provide data about the formation surrounding the conduit or borehole in which the valve is operating. Details of each individual stroke of poppet valve 83 are provided below.

Stroke 1—Poppet Travels Down

Figure 4A:
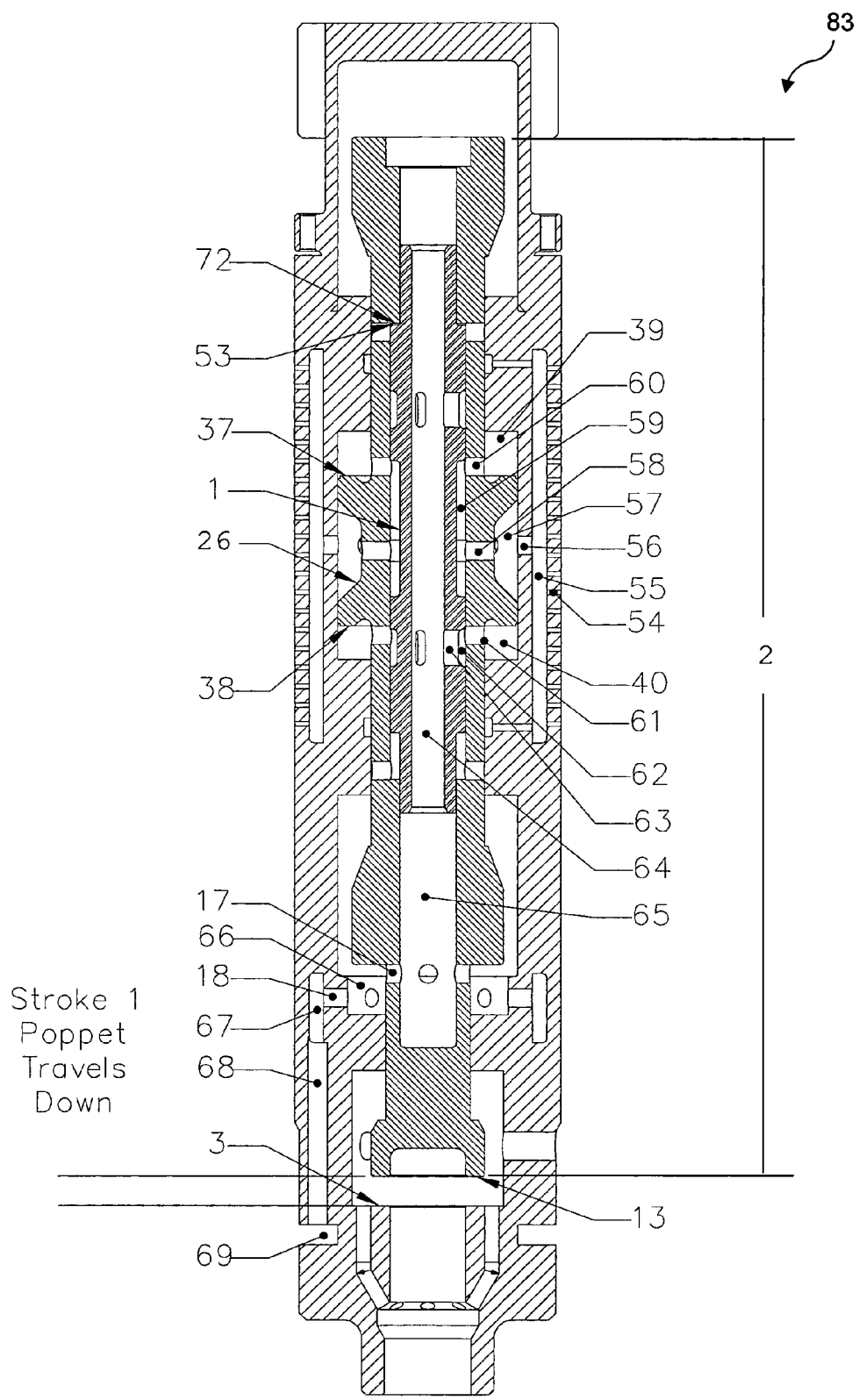
FIG. 4A is a cross-sectional view that illustrates a secondary flow path through the poppet spool as the poppet spool moves down towards its seat.

FIG. 4A shows poppet assembly 2 traversing down towards poppet seat 3. An upper shoulder 72 of pilot spool 1 is positioned against upper stop 53. Secondary flow enters cartridge assembly 10 from annular volume 47 (see FIG. 3) through multiple inlet openings 54 and pressurizes annular volume 55.

Pressure in annular volume 55 is directed to variable volume 39 above an upper poppet flange 37 in the following manner. Fluid passes through multiple ports 56 into annular volume 57 (disposed between the poppet flanges). Fluid flows from annular volume 57 into pilot annular volume 59 via multiple ports 58. Fluid in annular volume 59 moves into variable volume 39 via multiple poppet ports 60, thereby forcing poppet 26 downward. As poppet assembly 2 traverses downward, it displaces fluid from variable volume 40 below poppet lower flange 38. The displaced fluid moves through multiple poppet ports 61 into a pilot lower annular volume 62. The displaced fluid continues through multiple pilot ports 63 into pilot bore 64, which is in fluid communication with axial volume 65. The displaced fluid exits axial volume 65 via multiple ports 17, into annular volume 66, and from there, the displaced fluid moves through multiple ports 18 into annular volume 67. Annular volume 67 is in fluid communication with multiple axially oriented ports 68, each of which feeds into an annular volume 69, which itself is coupled in fluid communication with the borehole via multiple ports 35 (see FIG. 1A), enabling the displaced fluid to drain into the borehole.

Stroke 2—Pilot Travels Down

Figure 4B:
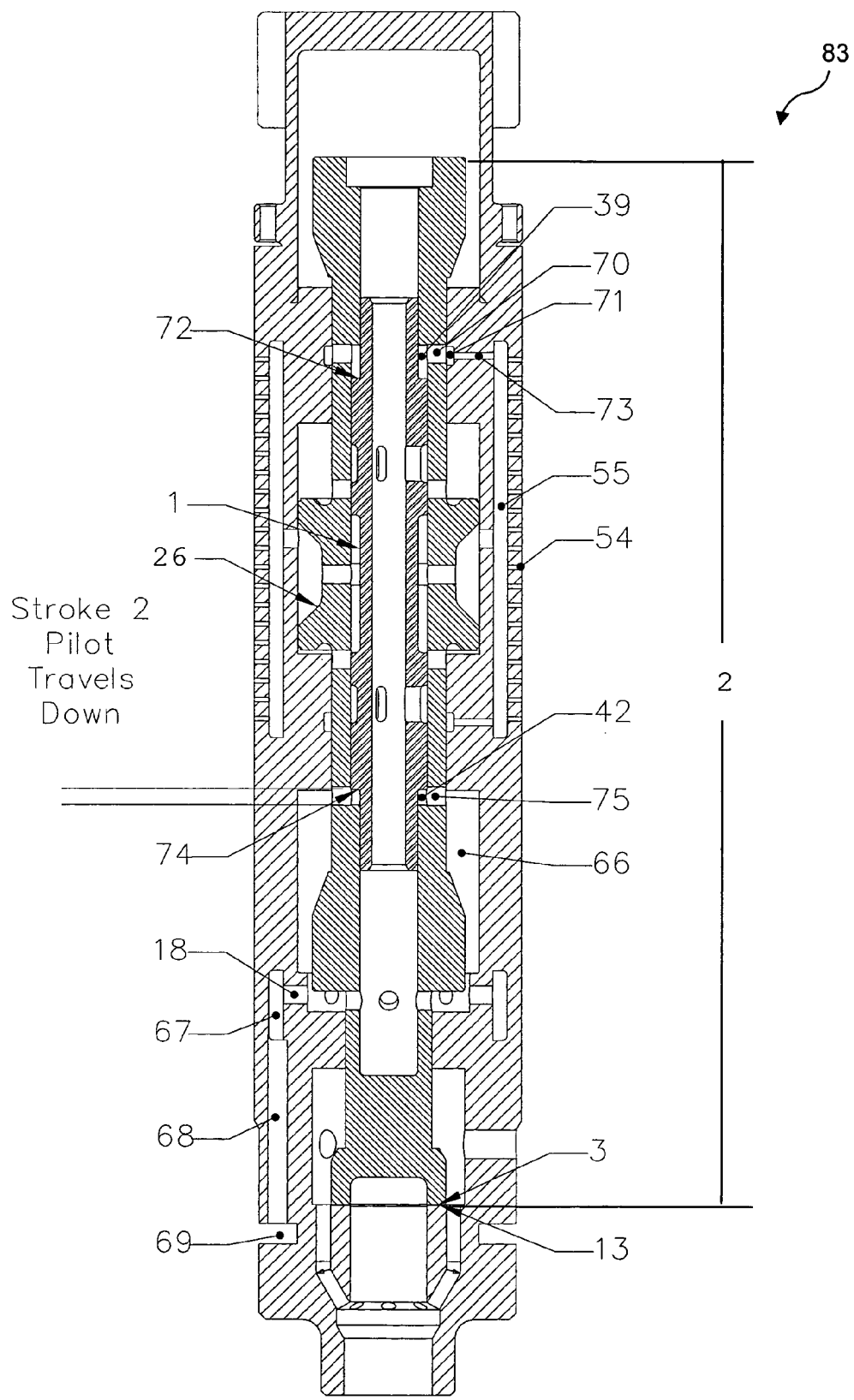
FIG. 4B is a cross-sectional view that illustrates the secondary flow path as the pilot spool travels down after the poppet spool has closed.

FIG. 4B shows poppet valve 83 fully closed. In the closed position poppet ring 13 is disposed against poppet seat 3. Pilot spool 1 is traversing downward inside of poppet assembly 2. Secondary flow continues to enter the valve cartridge from annular volume 47 (see FIG. 3) through multiple inlet openings 54 to maintain the pressurization of annular volume 55. As poppet assembly 2 traverses downwardly as described above in conjunction with the first stroke (FIG. 4A), multiple poppet ports 70 become aligned with annular volume 71, allowing pressurized fluid from annular volume 55 to enter variable volume 39 (above pilot upper shoulder 72) by way of port 73. Pressure above pilot shoulder 72 in variable volume 39 forces the pilot downward inside poppet assembly 2. The size of port 73 has a major effect on the downward speed of the pilot. As pilot spool 1 traverses downwardly, it displaces fluid from variable volume 42 (below pilot lower shoulder 74). The displaced fluid enters annular volume 66 via multiple poppet ports 75 and exits annular volume 66 through multiple ports 18, which are in fluid communication with annular volume 67. The displaced fluid then exits annular volume 67 through multiple axial ports 68, which are in fluid communication with annular volume 69. As noted above, annular volume 69 is coupled in fluid communication with the borehole via multiple ports 35 (shown in FIG. 1A), enabling the displaced fluid to drain into the borehole.

Stroke 3—Poppet Travels Up

Figure 4C:
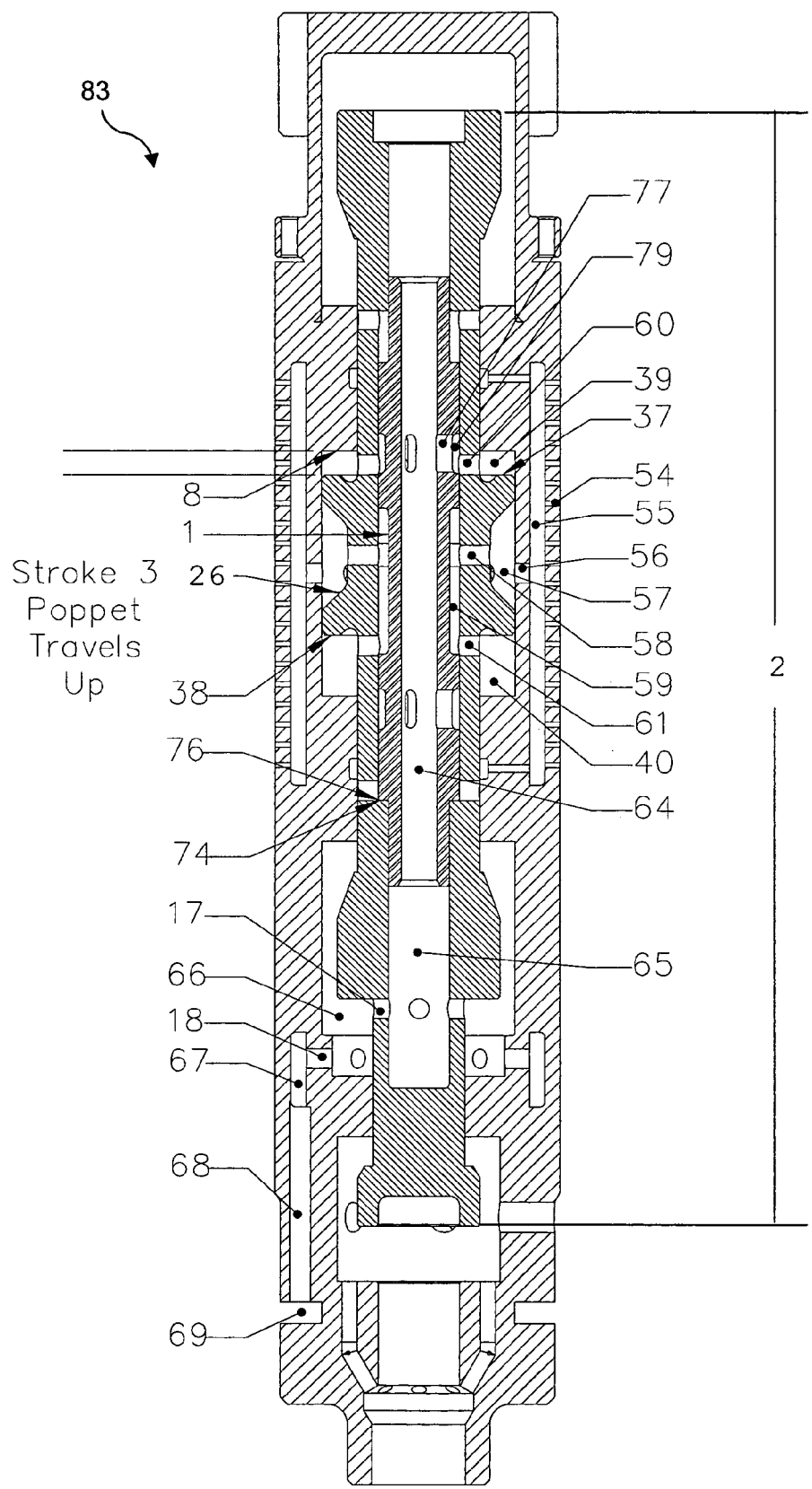
FIG. 4C is a cross-sectional view that illustrates the secondary flow path as the poppet spool travels up.

FIG. 4C illustrates poppet assembly 2 traversing up towards upper end ring 8 that forms its upper stop. Pilot lower shoulder 74 is disposed against lower stop 76 and is being carried up by poppet assembly 2. Secondary flow continues to enter the valve cartridge from annular volume 47 (see FIG. 3) through multiple inlet openings 54 to maintain the pressurization of annular volume 55. Fluid from annular volume 55 is directed to variable volume 40 (below poppet lower flange 38) in the following manner. From annular volume 55, fluid enters annular volume 57 (between poppet flanges) through multiple ports 56 and then flows into annular volume 59 through multiple ports 58. From annular volume 59, the pressurized fluid moves through multiple poppet ports 61 into variable volume 40, thereby forcing poppet assembly 2 upward. As the poppet assembly traverses upwardly, it displaces fluid from variable volume 39 (above poppet upper flange 37). The displaced fluid exits variable volume 39 through multiple poppet ports 60, which feed pilot annular volume 79. The displaced fluid exits annular volume 79 through multiple pilot ports 77, which are coupled in fluid communication with pilot bore 64. The pressurized fluid from pilot bore 64 then flows into axial volume 65. The displaced fluid exits axial volume 65 through multiple ports 17, which feed annular volume 66. As described above, the displaced fluid exits annular volume 66 through multiple ports 18, which are in fluid communication with annular volume 67. Again, the displaced fluid exits annular volume 67 through multiple axial ports 68, which are in fluid communication with annular volume 69. The displaced fluid exits annular volume 69 into the borehole via multiple ports 35 (as shown in FIG. 1A).

Stroke 4—Pilot Travels Up

Figure 4D:
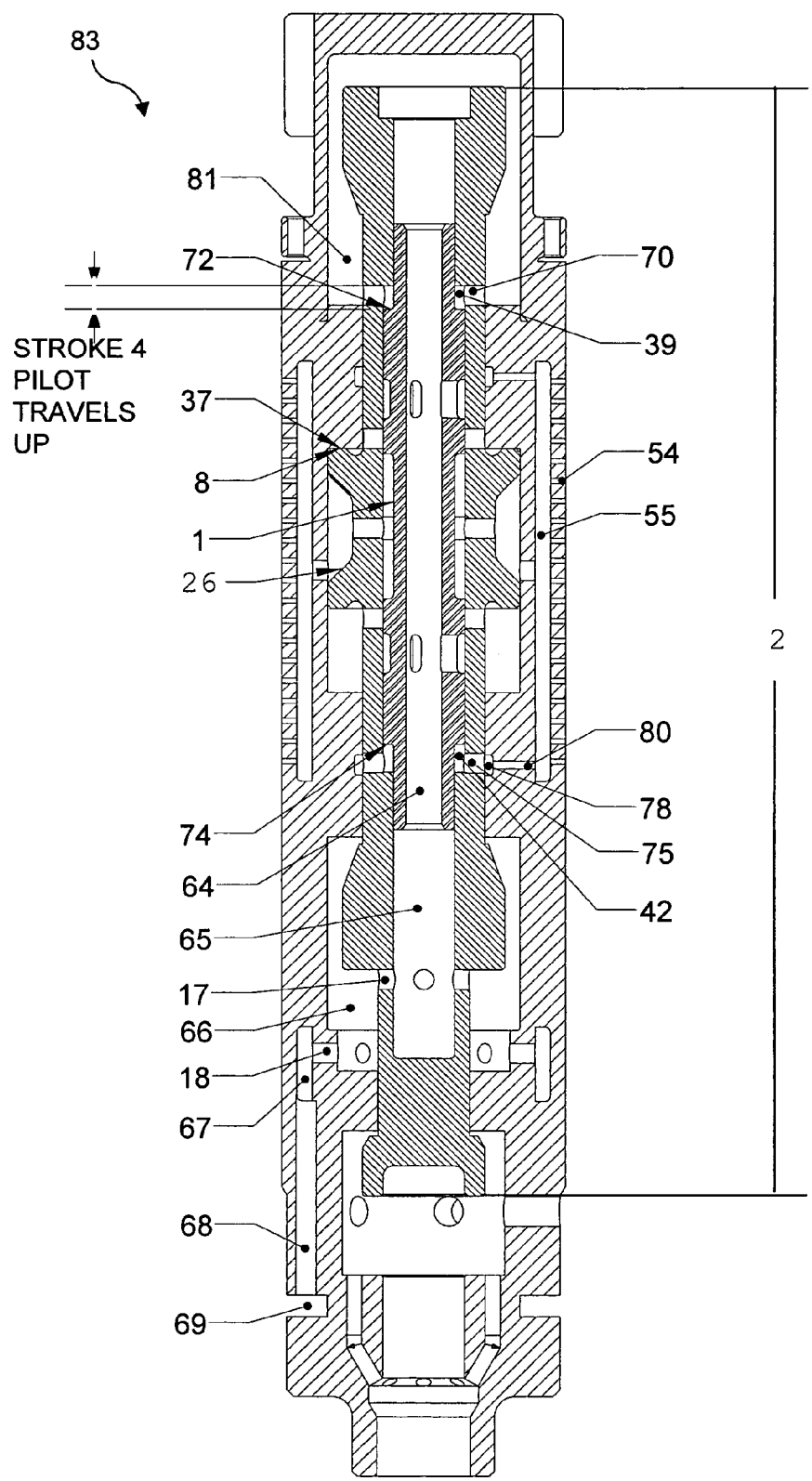
FIG. 4D is a cross-sectional view that illustrates the secondary flow path as the pilot spool travels up after the poppet spool has fully opened.

FIG. 4D shows poppet valve 83 fully open. Poppet upper flange 37 is now disposed against the stop formed by upper end ring 8, and pilot spool 1 is traversing upwardly inside poppet assembly 2. Secondary flow continues to enter the valve cartridge from annular volume 47 (see FIG. 3) through multiple inlet openings 54 to maintain the pressurization of annular volume 55. Multiple poppet ports 75 are aligned with annular volume 78, enabling pressurized fluid from annular volume 55 to enter variable volume 42 (below pilot lower shoulder 74) by way of port 80. The pressure below pilot lower shoulder 74 in variable volume 42 pushes pilot spool 1 upwardly inside poppet assembly 2. The size of port 80 has a major effect on the velocity of the pilot spool as it moves upwardly. As pilot spool 1 traverses upwardly, it displaces fluid from variable volume 39 (above pilot shoulder 72). The displaced fluid exits variable volume 39 through multiple poppet ports 70, which feed volume 81. Fluid from volume 81 flows down through pilot bore 64 into axial volume 65. The fluid exits axial volume 65 via multiple ports 17, which feed annular volume 66. As before, fluid exits annular volume 66 through multiple ports 18 and flows into annular volume 67. Fluid exits annular volume 67 through multiple axial ports 68 and flows into volume 69, which communicates with the borehole through multiple ports 35 (shown in FIG. 1A). The entire cycle repeats.

Pressure Profile

Figure 5:
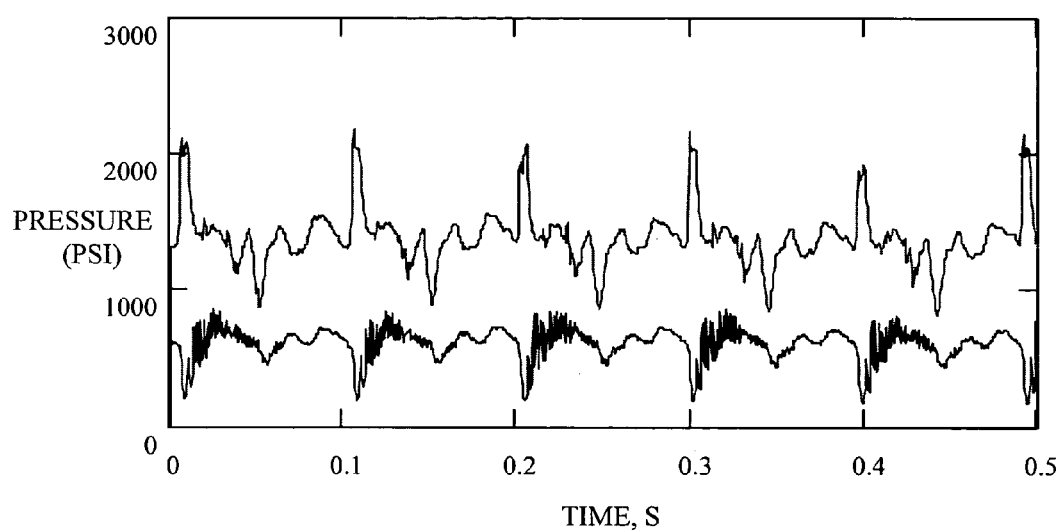
FIG. 5 is a graphical representation showing negative pressure pulses around the bit as a lower curve and upstream pressure pulses at the top of the tool as an upper curve.
Figures 7A, 7B, 7C, 7D:
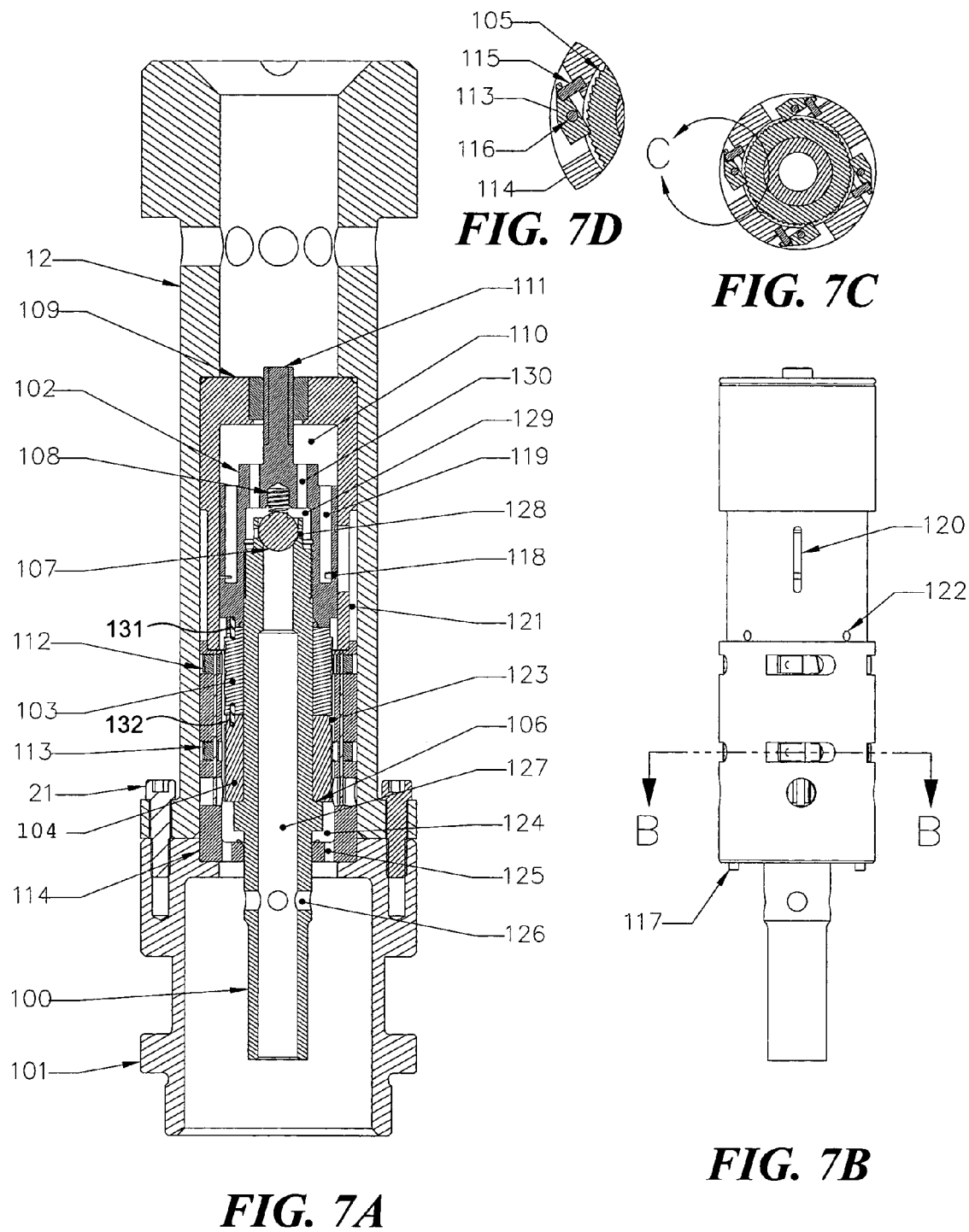
FIG. 7A is a cross-sectional view of a preferred frequency modulator in accord with the second aspect of the present invention.
FIG. 7B illustrates the frequency modulator of FIG. 7A, wherein the housing has been removed to provide greater clarity.
FIG. 7C is a cross-sectional view taken along section line B—B of FIG. 7B.
FIG. 7D is an enlarged portion "C" of the cross-sectional view of FIG. 7C.

Pressure fluctuations generated by the embodiment shown in FIG. 1A, with a 1.2 m long restricted flow course, are illustrated in FIG. 5. Pressure is observed upstream of the valve cartridge 10 inside the drillstring 16 and downstream of the valve cartridge beneath bit 15. The upstream pressure fluctuations are seen as positive pressure spikes, while the down stream pressure fluctuations are negative pressure spikes. The upstream and downstream pressure spikes are nearly simultaneous. The pulse rise time is on the order of one millisecond.

Alternative Embodiment Configured to Reduce a Water Hammer Effect

Those of ordinary skill in the art will recognize that completely interrupting a flow of fluid in a conduit can produce a water hammer effect. A valve that completely blocks the flow of drilling fluid without providing a drain port or diversion path creates water hammer pulses, or positive pressure pulses that propagate upstream of the interruption, into the drillstring, and the generation of such pulses is referred to as being caused by a water hammer effect. These pressure pulses lead to increased erosive wear of the valve components and can cause fatigue of upstream drillstring components. The valve cartridge assembly discussed in detail above includes ports 52 (see FIG. 3 in particular) around primary flow port 50. Because these ports allow fluid flow even when poppet valve 83 is fully closed, the fluid flow is never completely interrupted, and the water hammer effect is reduced somewhat. Testing of an empirical model consistent with the pulse tool shown in FIG. 3 has indicated a reduction of the water hammer effect of about 20%, over what the water hammer effect would be if ports 52 were absent.

FIGS. 6A and 6B illustrate an alternative embodiment of the pulse tool of the present invention, which is specifically configured to divert the flow of fluid when the valve is closed, thereby substantially reducing the water hammer effect while still generating negative pressure pulses. The diverter pulse tool of FIGS. 6A and 6B shares many common elements with the pulse tool of FIGS. 1A–4D, and where no modification to the elements has been made, the same reference numbers are used for both embodiments. The overall operation of the poppet valve remains the same. The primary difference in the embodiments is that the pulse tool of FIGS. 6A and 6B includes fluid channels configured to divert fluid flow away from the valve seat when the valve is closed, providing a path for the fluid such that little or no water hammer effect is produced. As the valve closes, a diverter port is placed in fluid communication with the secondary flow path. This feature enables the drilling fluid to flow from the poppet valve back into the borehole above the drill bit. Since the flow of drilling fluid into the borehole is not interrupted by closure of the flow interruption valve in the diverter pulse tool of FIGS. 6A and 6B, a fluid motor can readily be used to rotate the drilling bit, and the flow interruption valve and fluid motor can be used on a continuous flexible conduit type drillstring.

As with FIGS. 4A–4D, note that poppet assembly 2 has been somewhat simplified, in that the individual components of poppet assembly 2 are not shown separately in FIG. 6A. Those individual components, which include pilot bushings 4 and 5, upper and lower bushing retainers 27, poppet 26, cap screw 28, and poppet ring 13, are shown and fully described in connection with FIG. 2B.

The following modifications have been made to the diverter pulse tool of FIGS. 6A and 6B, as compared to the earlier described hydraulic impulse generator (i.e., hydraulic impulse generator 82 of FIGS. 1A–4D). The housing of the diverter pulse tool has additional passages and ports for the diverted flow. The clamp ring is longer to accommodate the diverter porting and includes a sealing ring for the diverter valve. The poppet assembly is longer to accommodate the diverter valve. The flow paths through the diverter pulse valve are described below.

Drilling fluid enters a diverter pulse tool 82a from the drill string above through axial grooves 46 in a cartridge 300 and enters annular volume 47 (which is defined by a housing 316 and cartridge 300). As shown in FIG. 3 (discussed in detail above), if a frequency modulator is used with the diverter pulse valve, drilling fluid first enters the frequency modulator from the drillstring, and fluid is passed from the frequency modulator to diverter pulse tool 82a via axial grooves 46.

From annular volume 47, the primary flow (~90 percent of the flow, the other 10 percent being used to energize the pulse valve) proceeds down through ports 301 in housing 316. Ports 301 lead to a volume 302 disposed adjacent to poppet ring 13. The primary flow moves from volume 302 into a volume 304 via ports 303. When the pulse valve is open, the primary flow exits volume 304 via central primary flow port 50, and continues on to drill bit 15.

When the pulse valve is closed (as shown in FIG. 6A), the primary flow through primary flow port 50 is interrupted, thereby producing the negative pressure pulse downstream of primary flow port 50. To reduce a water hammer effect that would produce positive pressure pulses upstream of primary flow port 50, the primary flow is diverted though a variable orifice 305 disposed between poppet assembly 2 and cartridge 300. The primary flow passes through variable orifice 305 into a volume 306, which is coupled in fluid communication with a volume 308 via ports 307. The primary flow proceeds through port 309 to fluid channels 310 (multiple fluid channels 310 can be seen in FIG. 6B) leading to the upper end of housing 316, and the primary flow is discharged via ports 311 (each fluid channel 310 being coupled in fluid communication with a port 311) to return to the surface. When poppet assembly 2 moves to close the valve (i.e., to block primary flow port 50), variable orifice 305 is sealed and the primary flow is discharged through primary flow port 50.

The secondary flow used to energize the pulse valve is generally consistent with the valve cycling described in detail above in connection with FIGS. 4A–4D, with the following exceptions. In hydraulic impulse generator 82 of FIGS. 1A–4D), displaced fluid exits axial volume 65 via multiple ports 17, into annular volume 66, and from there, the displaced fluid moves through multiple ports 18 into annular volume 67. Annular volume 67 is in fluid communication with multiple axially oriented ports 68, each of which feeds into an annular volume 69. Annular volume 69 is coupled in fluid communication with the borehole via multiple ports 35 (see FIG. 1A), enabling the displaced fluid to drain into the borehole. In diverter pulse tool 82a, annular volume 67 is in fluid communication with multiple ports 312, each of which feeds into an annular volume 313. Annular volumes 313 are coupled in fluid communication with the borehole via multiple ports 314 (see FIG. 6B) in housing 316, leading to flow courses 315.

While hydraulic impulse generator 82 and diverter pulse tool 82a each can be used in a variety of drilling and cleaning operations, it is likely that hydraulic impulse generator 82 (which as described above reduces the water hammer effect by about 20%) will be more often employed in cleaning and maintenance operations, while diverter pulse tool 82a (which as described above substantially reduces the water hammer effect, by about 90% or more) will most often be employed in drilling operations.

Frequency Modulator

The cycle rate of poppet valve 83 is controlled by slowing one of the pilot spool strokes. The frequency modulator (or frequency sweep mechanism) of the present invention dampens only the fourth stroke of the cycle described above, causing the poppet valve to remain open longer than it would otherwise. The frequency modulator includes a variable orifice used to dampen the fourth stroke. As the pilot spool travels upwardly, it engages a piston that pumps fluid through the variable orifice. The travel time required is determined by the size of the orifice. With each stroke, a rotary indexing mechanism changes the orifice size, causing a different stroke time. After one complete revolution of the indexing mechanism, the frequency sweep repeats.

The period of the sweep is determined by the number of indexer steps per revolution and the time of the undamped strokes. To be effective, the range of frequencies should cover approximately one octave and the period of each successive pulse should vary linearly with time until the frequency sweep is completed. These characteristics are primarily controlled by the shape of the variable orifice.

Preferably, the pulse valve and sweep mechanism are activated and deactivated from the surface by varying the drilling fluid flow rate and, therefore, its pressure downhole. When the pressure drop across the pulse tool and bit exceeds a predetermined "start" value, the pulse valve starts cycling and sweeping. When the pressure is reduced substantially below the start value, the pulse valve stops cycling and remains in the open position until the pressure is again raised above the start value. A detailed description of a pressure sensitive on/off mechanism is provided below, after a preferred embodiment of the frequency modulator is described.

FIGS. 7A–7D illustrate the frequency modulator, which is preferably installed in housing 12 (see FIG. 1A). Frequency modulator 84 includes an integral hydraulic damper and indexing mechanism. When frequency modulator 84 is attached to poppet valve 26, blind end cap 22 (see FIG. 2B) is replaced with a modulator end cap 101 that has a central opening enabling the frequency modulator to interface with poppet assembly 2 and pilot spool 1. Modulator housing 12 is attached to modulator end cap 101 with multiple fasteners 21, in the same manner that the blind end cap is attached. Modulator end cap 101 threads into clamp ring 7 and locks in position, just as does the blind end cap described in connection with FIG. 2B.

Frequency modulator 84 includes a timing shaft 100 that extends down into the top of poppet assembly 2 to engage pilot spool 1. Attached to the upper end of timing shaft 100 (via a threaded connection) is a rotary cushion 102. An angled knurl 103 and a straight knurl 104 are mounted on the timing shaft below rotary cushion 102. Straight knurl 104 includes multiple straight sawtooth-shaped teeth 105 (see detail C in FIG. 7D) that are oriented axially around the perimeter of the knurl. Angled knurl 103, disposed above straight knurl 104, includes similar multiple sawtooth-shaped teeth, except the teeth associated with angled knurl 103 are oriented helically around the perimeter of the knurl. One embodiment includes 60 teeth, defining 60 distinct rotary positions. Angled knurl 103 and straight knurl 104 are sandwiched between a shoulder 106 (on timing shaft 100), and the bottom of rotary cushion 102. Dowel pins 131 and 132 are used to orient the knurls relative to each other and the cushion. Disposed within timing shaft 100 are a ball 107 and a spring 108, which collectively form a check valve. Ball 107 is held against a seat on the end of the timing shaft by spring 108. Ball 107, spring 108, angled knurl 103, straight knurl 104, rotary cushion 102, and timing shaft 100 comprise the timing shaft assembly.

Rotary cushion 102 is a piston contained in an orifice cylinder 109. A variable volume 110 is defined by the top of rotary cushion 102 and orifice cylinder 109. A rod 111, which protrudes from the top of rotary cushion 102, extends up through orifice cylinder 109 and is exposed to system pressure from the drillstring above. A clearance seal between cushion rod 111 and orifice cylinder 109 discourages fluid at system pressure from entering variable volume 110.

Pivotally mounted pawls 112 and 113 are supported by a pawl mount 114 that surrounds knurls 103 and 104. Pawls 112 and 113 are biased by springs 115. Pins 116 are used as the pivotal mounts for pawls 112 and 113. One particularly long pin 116 engages a slot (not shown) in the bottom of orifice cylinder 109 to maintain alignment between the orifice cylinder and pawl mount 114. A typical embodiment includes four straight pawls 113 and four angled pawls 112 arranged in pairs 180 degrees apart for redundancy. Preferably, one pair of pawls is offset 87 degrees from the other pair to ensure pawl engagement under a wide range of operating conditions. Orifice cylinder 109 and pawl mount 114 are captured between modulator housing 12 and modulator end cap 101 and are prevented from rotating (relative to the end cap) by one or more dowel pins 117.

Figure 8C:
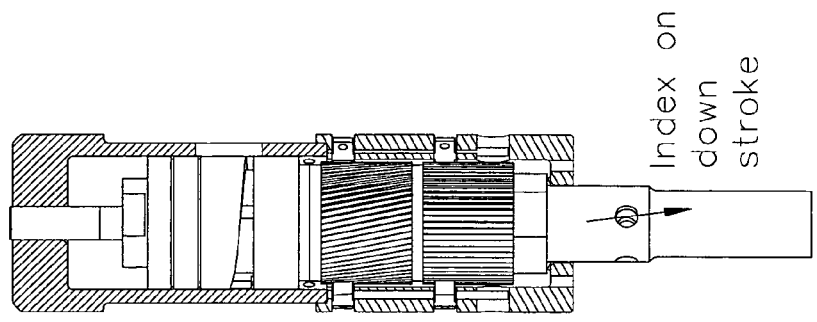
FIG. 8C is a partial section of the indexing mechanism of the frequency modulator of FIG. 7A, showing the indexing mechanism returning to the deactivated position and indexing.
Figure 8B:
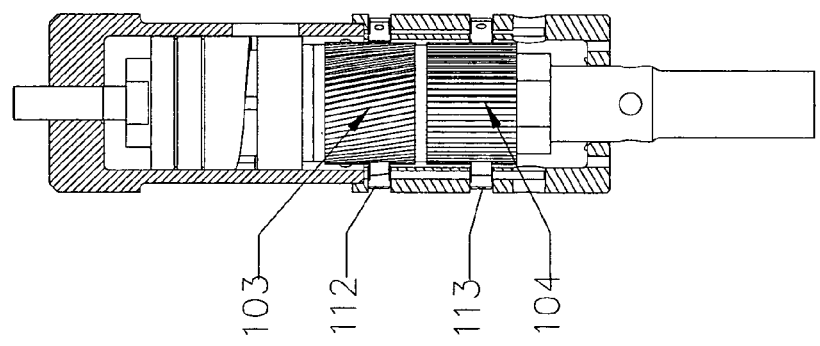
FIG. 8B is a partial section of the indexing mechanism of the frequency modulator of FIG. 7A, showing how the indexing mechanism is activated by the pilot spool.
Figure 8A:
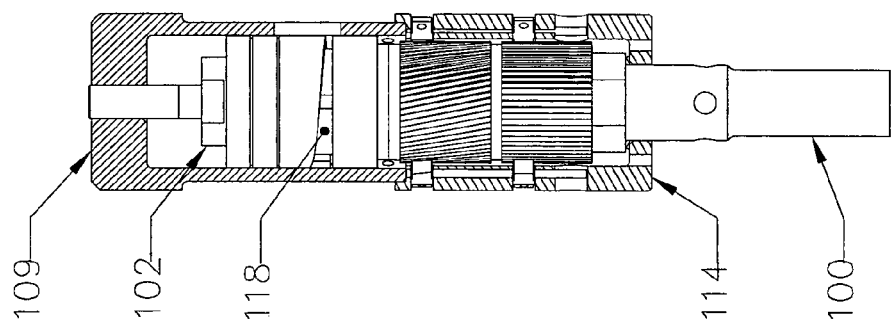
FIG. 8A is a partial section of the indexing mechanism of the frequency modulator of FIG. 7A, showing the indexing mechanism ready to be activated by the pilot spool.

Rotary cushion 102 includes a tapered circumferential slot 118 that extends about the circumference of rotary cushion (see FIG. 8A). Tapered circumferential slot 118 is in fluid communication with variable volume 110 via multiple openings 119 in rotary cushion 102. Orifice cylinder 109 includes a vertically aligned radial slot 120 that aligns with tapered circumferential slot 118. Radial slot 120 is in fluid communication with an annular volume 121 defined by orifice cylinder 109 and modulator housing 12. Annular volume 121 is coupled in fluid communication with an irregular annular volume 123 via openings 122 in orifice cylinder 109. Irregular annular volume 123 is defined by the knurls 103 and 104, and pawl mount 114 and is open to annular volume 124 (disposed below straight knurl 104). Annular volume 124 communicates with drain volume 81 (see FIG. 5D) in the pulse valve through multiple openings 125 (formed in the bottom of pawl mount 114).

Multiple openings 126 in the lower end of timing shaft 100 are configured to couple drain volume 81 (see FIG. 5D) in the pulse valve with axial volume 127 in timing shaft 100. Multiple openings 128 in the top of timing shaft 100 couple axial volume 127 (disposed inside the timing shaft) with annular volume 129 (disposed inside rotary cushion 102) when check valve ball 107 is not seated in a closed state. Multiple openings 130 inside rotary cushion 102 couple annular volume 129 with variable volume 110.

Frequency Modulator Operation

As described above, poppet assembly 2 and pilot spool 1 reciprocate axially inside poppet valve 83. The frequency modulator dampens only the upward stroke of pilot spool 1. To accomplish this function, timing shaft 100 engages pilot spool 1 when poppet 26 is at or near the top of its stroke, as the pilot is about to start its upward stroke. Timing shaft 100 moves up axially when pushed by pilot spool 1. FIGS. 8A–8C show the frequency modulator in different operational stages, but omit modulator housing 12 and end cap 101. To further simplify FIGS. 8A–8C, some of the reference numbers from FIG. 7A have been omitted.

The Variable Orifice

The rectangular opening formed by the intersection of tapered circumferential slot 118 and radial slot 120 creates a variable orifice between volume 110 and annular volume 121. When rotary cushion 102 moves up, volume 110 is reduced in size and the pressurized fluid in volume 110 is forced out through openings 119 in rotary cushion 102 to the tapered circumferential slot 118 in the cushion. The orifice formed by the tapered circumferential slot 118 and radial slot 120 restricts fluid flow from variable volume 110 thereby slowing the upstroke of pilot spool 1.

The width of tapered circumferential slot 118 varies around the perimeter of rotary cushion 102. To change the size of the orifice formed by the intersection of tapered circumferential slot 118 and radial slot 120, the rotary cushion rotates relative to orifice cylinder 109. An indexing device (described below) causes rotary cushion 102 to rotate slightly with each downward stroke. This rotation changes the size of the orifice, varying its resistance to fluid flow and thereby varying the upward motion of pilot spool 1, to modulate the stroke rate of poppet valve 83.

When the timing shaft/cushion assembly is moving upwardly, pressurized fluid is forced through the orifice formed by tapered circumferential slot 118 and radial slot 120 into annular volume 121. Fluid then passes through openings 122, irregular annular volume 123, annular volume 124 and openings 125 to drain volume 81 (FIG. 5D) in poppet valve 83. Drain volume 81, as previously described, is coupled in fluid communication with borehole 32 (FIG. 1) through internal passages ending at ports 35 in housing 11 (borehole 32, one port 35, and housing 11 are shown in FIG. 1A).

The Indexing Function and Mechanism

The indexing function can best be understood in reference to the details of FIG. 7D and FIGS. 8A–8C. As the timing shaft assembly moves upward axially in housing 12 (see FIG. 8B), straight pawls 113 engage straight knurl 104, thus preventing the timing shaft 100 from rotating. At the same time, angled pawls 112 skip over one or more teeth of angled knurl 103. As timing shaft 100 moves downwardly (FIG. 8C), angled pawls 112 engage the teeth in angled knurl 103, forcing timing shaft 100 to rotate. As the timing shaft assembly moves downward and rotates, straight pawls 113 skip over one or more teeth of straight knurl 104.

Redundant pawls 112 and 113, and their irregular positions (as described above) ensure that at least one pawl will engage the next knurl tooth even if pilot spool 1 makes only a partial stroke, or if the other pawl fails to engage. The amount of timing shaft assembly rotation depends upon the length of travel and the number of teeth on the knurls. For an embodiment with 60 teeth, a normal stroke traverses two teeth, resulting in $1/30^{th}$ of a revolution, or 12 degrees of rotation. If for some reason the pilot does not travel as far as expected, only one tooth will be traversed and the shaft will rotate only 6 degrees for that stroke. Conversely, if the pilot travels farther than expected, three or more teeth will be traversed and timing shaft 100 will rotate 18 or more degrees for that stroke. As noted above, pin 117 (FIG. 7B) prevents rotation of the pawl mount 114 relative to end cap 101.

The Retract Stroke

As described above, the timing shaft assembly is driven upward by pilot spool 1. The timing shaft assembly is driven back down by fluid pressure from the drillstring above acting on the end of cushion rod 111. As the timing shaft assembly retracts (downward), drilling fluid is drawn into variable volume 110 from drain volume 81 (FIG. 5D) of poppet valve 83 as follows. Fluid enters variable volume 110 through openings 126 in timing shaft 100, through axial volume 127 (in the timing shaft), and is exposed to the check valve (ball 107 and spring 108) in the top of the timing shaft. When the force due to fluid pressure below ball 107 exceeds the force of spring 108 plus the force due to fluid pressure above the ball, the ball lifts off the seat, which allows fluid to pass through openings 128 in timing shaft 100 and into annular volume 129. The fluid flows through openings 130 and into variable volume 110.

The Modulator Frequency Sweep

Figure 9:
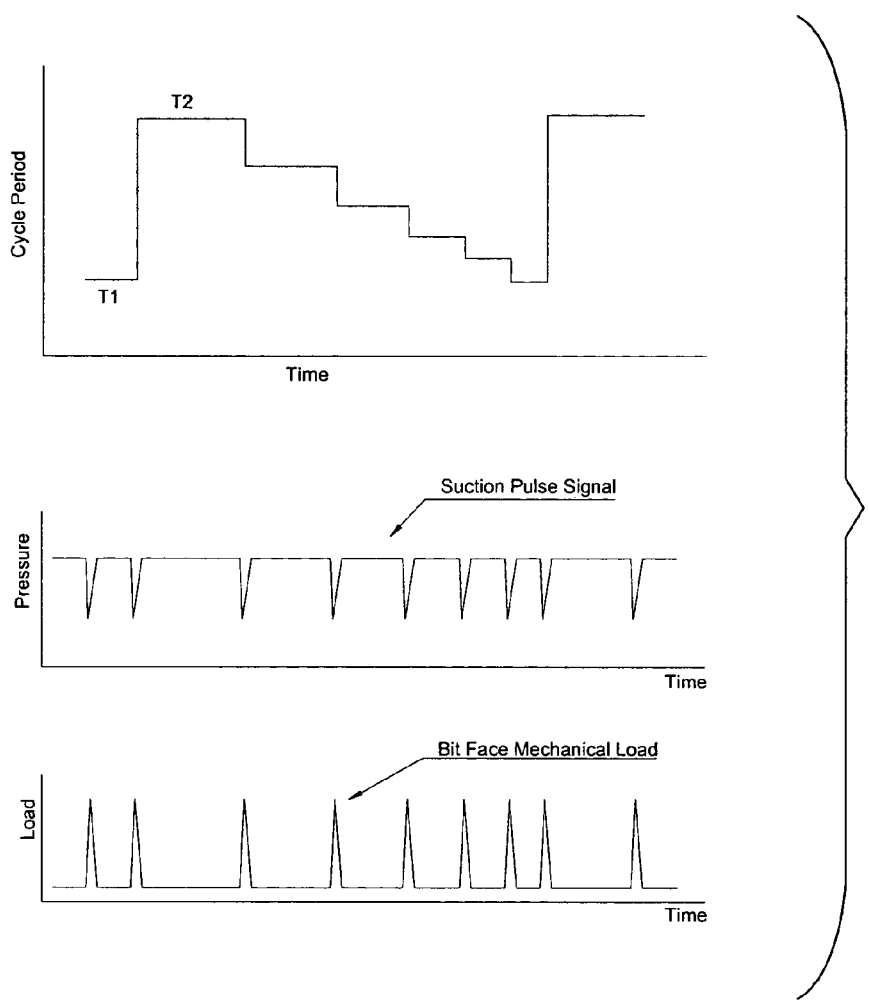
FIG. 9 illustrates three graphs showing the linear sweep of impulsive negative and mechanical pulses.

The effect of linearly varying the pulse rate of poppet valve 83 is to create a frequency sweep of the impulse rate. FIG. 9 shows how cycle period, bit pressure, and bit face load vary with time.

The On/Off Mechanism

The optional on/off mechanism is shown in FIGS. 10A–10C. The on/off mechanism uses a slightly modified orifice cylinder 201 (as compared to orifice cylinder 109 of FIG. 7A) and a retainer 202 as shown in FIG. 10A. A spring housing 200 is disposed between orifice cylinder 201 and retainer 202. Inside spring housing 200 is disposed a piston 203 that is downwardly biased by a spring 204. Inside the piston is disposed a tube 205 that is held in place by a cap 206, which is threaded into the end of spring housing 200. The interior of tube 205 is open to system pressure above the tool through openings 207 in cap 206. Tube 205, spring housing 200, and piston 203 contain ports that open and close depending upon the position of the piston. The ports allow fluid at system pressure to flow into a spring volume 208 disposed above the piston, or a rod volume 209 below the piston, or vent pressure from these volumes to annular drain volume 121 (disposed between orifice cylinder 201 and retainer 202). O-ring seals disposed between parts prevent pressure leakage from one volume to another. Since O-ring seals can be abraded when sliding across ports, piston 203 and tube 205 also include a conical seat seal 210 to prevent leakage when the piston is down (as shown in FIG. 10A) and a conical seat seal 211 to prevent leakage when the piston is up (as shown in FIG. 10C).

Spring 204 is preloaded by a ring 212 that is adjusted by multiple set screws 213 that are accessible through cap 206. The preload on the spring determines the "start" pressure of the tool. Rod 111 of rotary cushion 102 protrudes through the top of orifice cylinder 201 to contact piston 203 as the timing shaft assembly travels up during the fourth stroke of the pulse valve (i.e., when the pilot is traveling upwardly inside poppet 26).

The indexing mechanism described above converts an axial motion of the pilot spool into a rotary motion that changes the size of the variable volume, which in turn affects the axial motion of the pilot. If desired, the pawl and ratchet mechanism described above can be replaced by either an external motor, or by a downhole motor that is powered by drilling fluid.

Operation of the On/Off Mechanism

As noted above, preventing pilot spool 1 from traveling upwardly in poppet assembly 2 effectively holds poppet valve 83 open, preventing cycling. When system pressure is low, fluid pressure is directed to both sides of piston 203 via openings 214 (in tube 205) and an opening 215 (in the bottom of the piston). Due to the larger area of the spring side of piston 203 and the force of exerted by spring 204, the piston is held down against conical seal seat 210. When the system pressure acting on pilot spool 1 is insufficient to overcome the spring bias force, piston 203 holds the timing shaft assembly down and therefore, pilot spool 1 is prevented from traveling upwardly in poppet assembly 2, and the pulse valve is OFF in the open position.

When system pressure acting on pilot spool 1 is sufficient to partially compress spring 204 and overcome the differential pressure force on piston 203, as shown in FIG. 10B, side ports 216 in the piston release fluid pressure from spring volume 208. The released fluid moves to drain volume 121 through ports 217 in spring housing 200. Simultaneously, lateral ports 214 (in tube 205) are covered by piston 203, preventing fluid at system pressure from entering spring volume 208. At this point, the pressure above the piston is low (at a drain pressure) and the pressure below the piston is high (at the system pressure), causing piston 203 to continue traveling upwardly until it is stopped by conical seat seal 211 (on tube 205) as shown in FIG. 10C. With piston 203 up and out of the way of cushion rod 111, the cushion/timing shaft assembly is free to move up and down, enabling the pulse valve to run continuously in the ON condition.

When system pressure is reduced sufficiently by the drilling rig operator so that spring 204 overcomes the imbalance of pressure on piston 203, the piston travels downwardly, closing drain port 217 and opening lateral ports 214 (in tube 205) as shown in FIG. 10B. This condition readmits fluid at system pressure into spring volume 208, rebalancing pressure across piston 203, so that spring 204 drives the piston downwardly against lower seat seal 210, which holds the timing shaft assembly down. Pilot spool 1 is thereby prevented from traveling upwardly in poppet assembly 2, poppet valve 83 is held in the open position. The reduced system pressure is the "stop" pressure, and under such pressure conditions, the poppet valve is in the OFF condition. When system pressure is again increased above the "start" pressure, piston 203 retracts (as described above), and the pulse valve begins cycling again. The difference between the start and the stop pressure must be relatively large so that the poppet valve is not accidentally activated or deactivated by normal fluctuations in rig pressure. The difference in pressure should be at least 10% of the nominal operating pressure.

Note that the operation of the ON/OFF mechanism is not functionally dependant upon the sweep mechanism. The ON/OFF mechanism can be applied to the impulse generator without including any rotary indexing mechanism.

Seals

Elastomeric O-ring seals (seal 30 in FIG. 2B) between components prevent fluid flow leaking out between stationary parts. As end cap 22 is threaded into clamp ring 7, it compresses the seals in poppet valve 83 (as shown in FIGS. 2 and 3). Elastomeric O-ring seal 19 between clamp ring 7 and housing 11, and another O-ring seal 20 between poppet seat retainer 14 and housing 11 prevent fluid communication between the primary and secondary flows.

Preferably, clearances are minimized between the dynamic sealing surfaces of the following components to reduce leakage between the various cavities:

1. pilot spool 1 and poppet 26;
2. pilot spool 1 and pilot/poppet bushings 4 and 5;
3. poppet 26 and end rings 8 and 9;
4. poppet flanges 37 and 38 and cylinder 6;
5. poppet bushing 5 and seal ring 25; and
6. cushion 102 and orifice cylinder 109, at the major diameter and at rod 111.

Leakage reduces the efficiency of the valve, and the high velocity drilling fluid flowing through the leakage paths encourage erosion of the dynamic sealing surfaces and eventual failure of the valve. An optional embodiment uses piston rings (not shown) on the poppet flanges 37 and 38 to seal poppet 26 relative to cylinder 6.

Materials Used for Valve Construction

In service, the pulse valve components are subjected to high static and cyclic stress, impact, fatigue, wear, corrosion and erosion. Loads produced by fasteners and threaded connections produce high static stresses in parts. Fluctuating internal and external pressures resulting from periodically blocking the drilling fluid flow to the bit (see FIG. 2B) produce high cyclic stresses in parts and fasteners.

In a preferred embodiment, poppet ring 13 impacts poppet seat 3 at the lower end of the travel of poppet assembly 2. Upper poppet flange 37 impacts upper end ring 8 at the upper end of travel. Pilot spool 1 also impacts on poppet bushing 9 at its lower end of travel and impacts pilot bushing 8 at the upper end of its travel. Stress waves caused by the impacts travel up and down through poppet assembly 2 and pilot spool 1 at the speed of sound. The velocity of poppet assembly 2 and pilot spool 1 affects the magnitude of the impact stresses. Material properties of the impacting parts, such as elastic modulus and density, also affect the magnitude of the impact stresses. By changing the size and location of ports and grooves in poppet 26, pilot spool 1 and end rings 8 and 9, it is possible to minimize or eliminate one or more of the impacts.

Cyclic and reversing stresses resulting from impacts can cause cracks to form and grow at stress concentrations, surface flaws, and internal flaws. Generally, harder materials, such as hardened tool steel and carbides, are less able to resist fatigue crack growth.

The relative motion of poppet assembly 2 and pilot spool 1 in the cartridge assembly, particularly in the presence of abrasive particles in the drilling fluid, causes wear of the dynamic surfaces. Abrasive particles expected to be present in drilling fluids include bentonite, barite, quartz, silica, iron oxide, and bits of worn metallic or carbide materials from the surface pumps, downhole motors, and the hydraulic pulse valve itself. Materials that resist wear are generally less resistant to impact. A trade-off between these considerations is required to obtain acceptable tool life with respect to both impact wear and abrasive wear.

Water-based drilling fluids cause corrosion of iron-based metals such as steel. Corrosion is accelerated by the low pH or acidity of the fluid. The cobalt binder in tungsten carbide is particularly susceptible to corrosion by low pH fluids. The pH of drilling fluid is thus often controlled to be slightly basic (>8) to protect the steel and carbide parts.

Wear can also be caused by other factors. For example, high pressure drilling fluids moving at high velocity from high pressure areas to low pressure areas, such as across poppet 26 and pilot spool 1 clearance seals, causes increased rates of material removal.

Finite element analysis of static and dynamic stresses was used to establish the dimensions and to select materials, heat treatment, and surface treatments for many highly stressed components, such as poppet 26, poppet bushing 5, pilot bushing 4, poppet ring 13, poppet seat retainer 14, seal ring 25, and pilot spool 1 (see FIGS. 3 and 5A–5D). Poppet 26 and pilot spool 1 are preferably made of impact and wear resistant tool steel. The wear surfaces of poppet 26 and pilot spool 1 are preferably treated to increase their surface hardness and to resist corrosion. Optional surface hardening processes include boronizing, nitriding, and carbonitriding. Optional surface coating processes include thermal spraying or the high velocity oxy-fuel (HVOF) application of tungsten carbide and a suitable binder. In a preferred embodiment, poppet ring 13, poppet seat 3, poppet bushing 5, and pilot bushing 4 are formed of impact resistant tungsten carbide. End rings 8 and 9, cylinder 6, seal ring 25, and poppet seat retainer 14 are formed of wear resistant tungsten carbide.

Poppet 26 and pilot spool 1 can also be made of impact resistant tungsten carbide. Preferably, poppet bushing 5 and pilot bushing 4 are made of tool steel with appropriate surface treatments.

Valve cartridge fasteners are self-locking and made of high-strength alloys. All other parts of valve cartridge 10 are made of nitrided alloy steel or corrosion resistant steel. Housing 11 is alloy steel identical to that used in other BHA components. O-rings are made of fluorocarbon elastomer to resist high temperature and drilling fluid.

Impulse Generator Applications

The improved impulse generator described above has a wide range of potential applications including:

Oil/Gas/Geothermal Drilling, Completion and Workover increase the rate of penetration in rock by aiding rock chip removal and reducing chip hold-down pressure through rapid decompression of the well-bore at the bit;

cyclic loading of the bit and drillstring reduce stick-slip and bit whirl for high weight-on-bit rock drilling;

cyclic loading of the drillstring by the combined effect of upstream and downstream fluid pulses eliminates static friction between the drillstring and borehole wall for extended reach horizontal drilling;

SWD utilizing the downhole seismic pressure waves in the earth for directional control and measurement of geological conditions ahead of the bit;

combined negative and upstream pulses generate a tractive force on the drillsting for work in extended reach boreholes;;

stimulation of existing production wells using acoustic energy from a downhole source for remediation of formation damage, increasing permeability and increasing oil production;

environmental remediation of spills using seismic pulses to enhance the extraction rate of groundwater contaminants;

Chemical Processing mixing fluids or slurries;

excite chemical reactions in flow streams; and

The present invention generates suction pressure pulses in a borehole cavity downstream of the valve. The valve cartridge could also be deployed in different configurations to generate suction pulses in a well completion to remediate damage and stimulate production. Examples of potential applications include:

Enhanced flowback for removal of damage from perforations;

Remediation of polymer damage in gravel packed screens;

Openhole stimulation in carbonate wells;

Enhanced acidizing;

Sand cleanout; and

Stimulation of cold heavy oil with sand production;

The utilization of the pulse generator tool in accord with the present invention will depend in detail on well geometry and reservoir characteristics. A review of the pulse generation technique is provided here to assist in the evaluation of well stimulation applications.

The basic configuration of the pulse generator tool is shown in FIG. 11A. A pump 1102 is employed to pump a relatively incompressible fluid (water or drilling mud) from the surface through a supply tube 1104 to a valve cartridge 1106 at a rate Qo. It should be understood that valve cartridge 1106 is consistent with the description herein of a two-member valve, wherein the second member is disposed within the first member (FIGS. 1A–4D illustrate an exemplary valve cartridge; however, as noted herein, the present invention encompasses related embodiments). The flow of pressurized fluid discharges into a well completion cavity 1108 having a net volume Vc. The pressurized fluid returns to the surface via a flow restriction 1110, wherein the flow restriction has an associated area Ar and length Lr. The flow restriction may be formed by providing a length of supply tube with an enlarged diameter 1112 so the flow annulus between the enlargement and a well casing 1114 is restricted. If desired, a soft seal 1116 (such as an elastomeric material) can be coupled to the supply tube adjacent valve cartridge 1106 to ensure that the upward flow of fluid is not allowed to continue into the entire annular volume defined by enlarged diameter 1112 and well casing 1114, thereby further restricting the volume of flow restriction 1110.

FIG. 11B is a cross sectional view of a borehole, showing the relative positions of supply tube 1104, enlarged diameter 1112, seal 1116 and flow restriction 1110. It should be understood that the cross sectional area of flow restriction 1110 is not required to be circular. If desired, flow restriction 1110 could encompass the entire annular volume between the well casing and the enlarged diameter. As the mathematical relationships described below indicate, the length of the flow restriction and the cross sectional area of the flow restriction effect the magnitude of the pressure pulse generated. Thus, the area and length of flow restriction 1110 can be manipulated to achieve a desired suction pulse magnitude.

The embodiment of FIG. 11C is similar to that of FIG. 11B; however, no seal is employed in the embodiment of FIG. 11C, and an enlarged diameter 1112a is larger than enlarged diameter 1112 of FIG. 11B. As a result, the cross-sectional area of a flow restriction 1110a is the entire annular volume between the well casing and the enlarged diameter.

A suction pulse is generated because the kinetic energy of the fluid moving up through the flow restriction is converted to the elastic potential energy of a suction pulse in the borehole cavity. The kinetic energy of the moving fluid is:

$$KE = 0.5 \rho L_r A_r \left(\frac{Q_o}{A_r}\right)^2 = 0.5 \rho L_r \frac{Q_o^2}{A_r}$$

The potential energy of the pulse is:

$$PE = \frac{V_c \Delta P^2}{K}$$

where $\Delta P$ is the drop in fluid pressure and K is the bulk modulus of the fluid ($K_{water}$=2.2 GPa). Equating the kinetic energy to the potential energy provides the suction pulse amplitude:

$$\Delta P = Q_o \sqrt{\frac{\rho L_r K}{2 V_c A_r}}$$

The pulse amplitude is proportional to flow rate and to the square root of the length of the flow restriction and inversely proportional to the square root of the cavity volume and flow restriction area. For example, a 5 m long, 160 mm (6¼") open hole completion has a volume of 0.1 m³ (i.e., Qo=0.1 m³). A flow restriction area of 0.001 m² (a 1.4" ID tube) and a flow rate of 0.025 m³/s (400 gpm) would give a pulse amplitude of 8 MPa in a 10 m flow course, 26 MPa in a 100 m flow course, and 82 MPa in a 1000 m flow course. The pulse energy corresponds to 313 J per meter of flow restriction length. The circulating pressure increase would be 0.115 MPa/m at 400 gpm.

The maximum pulse duration is determined by the minimum of two-way travel time of an acoustic pulse in the flow restriction or the time the valve stays closed, $t_c$, $$\Delta t = \min\left[\frac{2L_r}{c}, t_c\right]$$

where c is the speed of sound (about 1500 m/s) in water.

The valve closure time can be controlled with ports in the valve. A current implementation of the valve cartridge of the present invention can remain closed for from about 3 ms to about 100 ms depending on porting. The length of the flow restriction for drilling applications is only 1.2 m, which results in a pulse having a duration of 1.6 ms. A stimulation tool based on such an implementation would preferably include a significantly longer flow restriction. A flow restriction length of from about 10 m to about 100 m would generate pulses of from about 10 ms to 100 ms in duration. A tool configured to generate 10 ms pulses would operate at around 10 Hz. Since each pulse is about 3 kJ, the power output would be up to about 30 kW.

The pulse profile is characterized by a rapid reduction in pressure designed to introduce a high pore pressure gradient across the rock surface. This high pore-pressure gradient will mobilize debris and other matter that characterize formation damage.

Frequency Modulator Applications

Since the frequency modulator only dampens the upstroke of the pulse cartridge pilot valve, the pulse valve poppet closing rate is not affected by the frequency modulator. The tool therefore generates a series of identical high amplitude impulses with changing cycle periods.

Tapered circumferential slot 118 in rotary cushion 102 (see FIGS. 7A, 7B, and 8A–8C) can be configured to control the impulse cycle period as desired. In a preferred embodiment of the invention, the slot opening is configured as shown in these Figures to cause the cycle period between impulses to vary by a factor of two, with the period varying linearly with time. The linear cycle period sweep is shown in FIG. 9. For example, the cycle period may be swept from 0.2 s to 0.1 s. Other cycle period sweeps may also be generated. The cycle period may be swept up or down with no effect on the bandwidth of the signal. A variation in the sweep period preferably provides a full octave change in the cycle frequency. Sweeping the cycle frequency over a full octave generates a broadband signal with the high frequency limited by the duration of the impulse. A partial octave sweep generates a broadband signal with notches in the frequency corresponding to the missing cycle frequency and its higher harmonics. Those skilled in the art will recognize that notches in the bandwidth will reduce the resolution of the seismic signal. However, a partial octave sweep can still be used for profiling and reflection, although the resolution will be degraded.

Figure 12B:
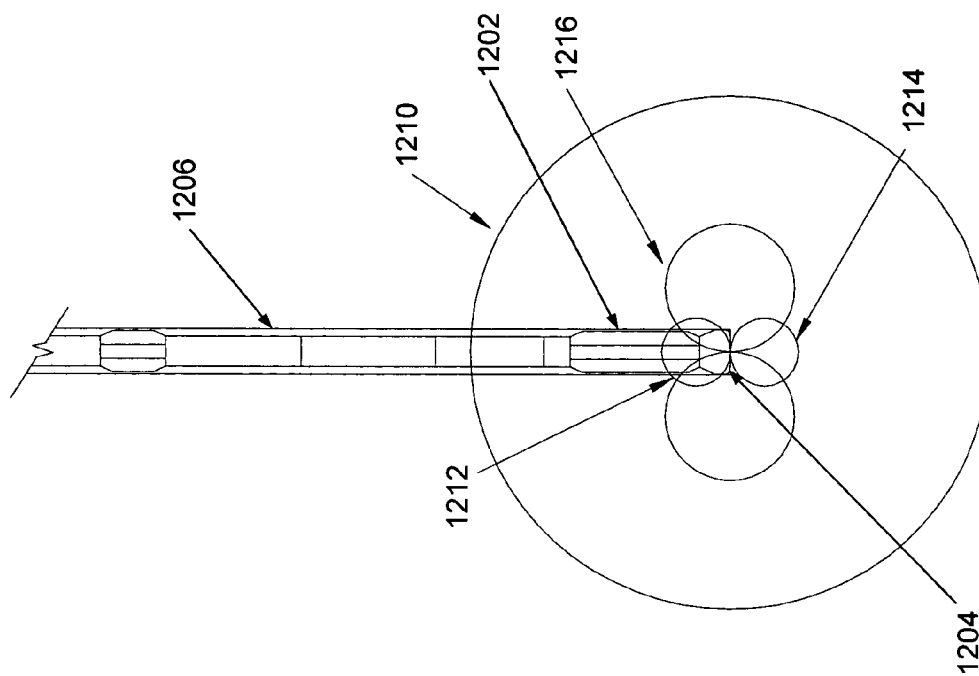
FIG. 12B shows the seismic radiation pattern achieved by the frequency modulator of the second aspect of the present invention when the tool is in contact with the bottom of the borehole.
Figure 12A:
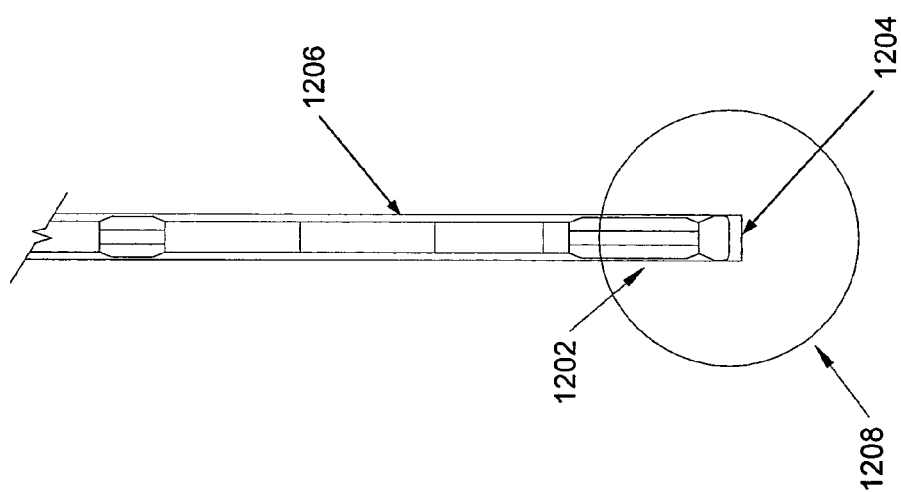
FIG. 12A shows the seismic radiation pattern achieved by the frequency modulator of the second aspect of the present invention when the tool is not in contact with the bottom of the borehole.

The radiation pattern generated by the swept impulse source is shown in FIGS. 12A and 12B. A source 1202 (i.e., a pulse valve combined with the frequency modulator as described above) is shown with the drill bit slightly off the bottom (FIG. 12A) and on the bottom (FIG. 12B). When source 1202 is slightly (i.e., less than one bit diameter) off bottom 1204, as shown in FIG. 12A, a pressure pulse 1208 is generated in borehole 1206 around the bit face and flow course housing. Pressure pulse 1208 radiates in all directions from source 1202 and in the far field, the source can be approximated as a spherically symmetric pressure pulse originating from a sphere with a diameter equal to the borehole diameter. When the bit is on the bottom, as shown in FIG. 12B, in addition to a tensile pressure pulse 1210, secondary dipole waves 1212 and 1214, as well as shear waves 1216, are generated due to the mechanical interaction of the bit with the rock. Dipole wave 1214 is a compression wave propagating downwardly, and dipole wave 1212 is a tensile wave propagating upwardly.

Figure 13:
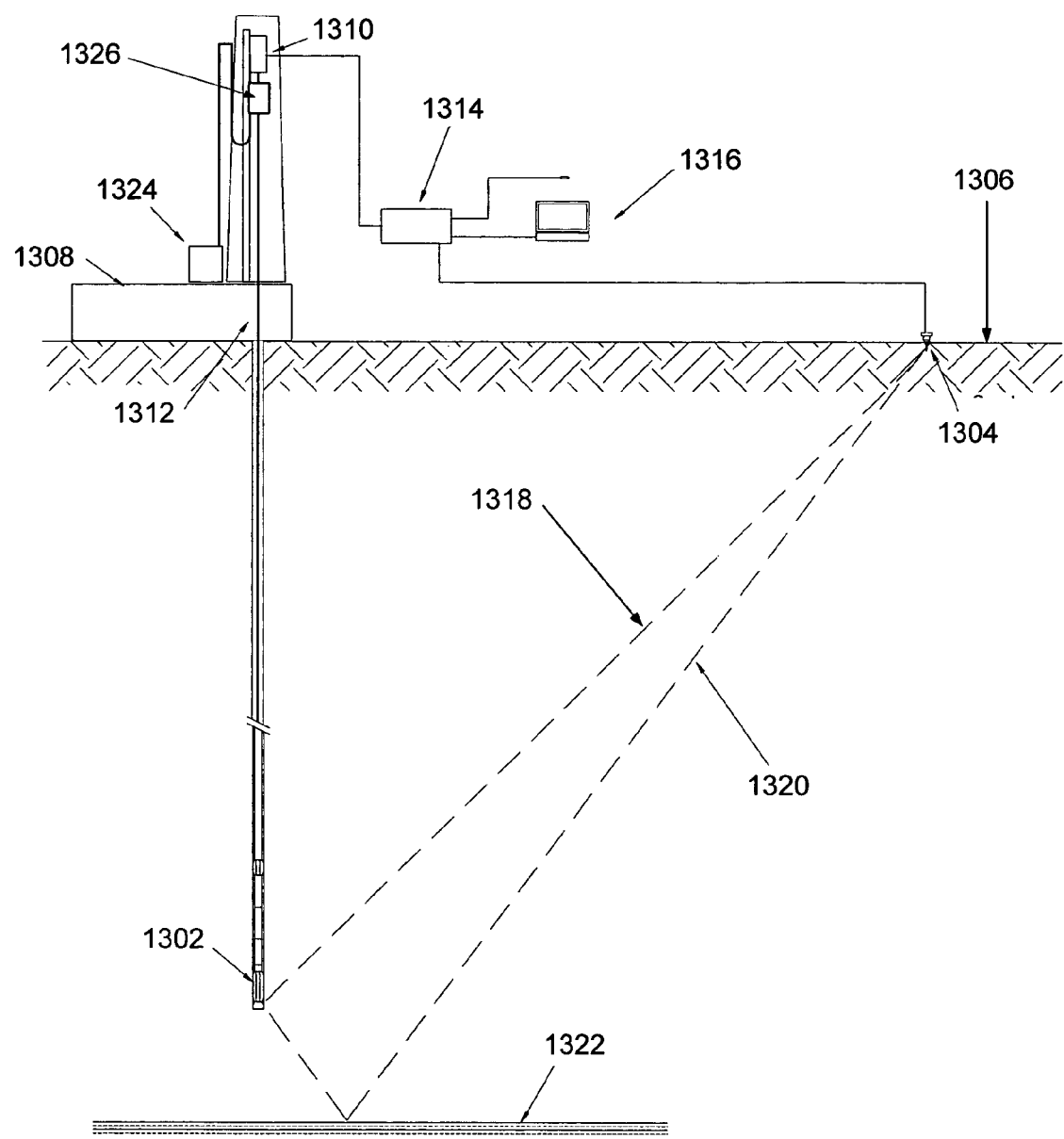
FIG. 13 shows the frequency modulator of the second aspect of the present invention being used for reverse vertical seismic profiling and reflection imaging while drilling.

FIG. 13 shows the use of a swept impulse seismic source 1302 (i.e., the pulse valve and frequency modulator combination described above) for SWD operations with a set of seismic receivers 1304 at ground level 1306. The signal processing techniques are well know and are similar to the approach used to process a drill-bit seismic source or swept frequency source. In the preferred embodiment of the invention, one or more subarrays of receivers 1304 are located in a pattern extending radially from a drilling platform 1308. The use of subarrays reduces drilling noise propagating from platform 1308 and amplifies signals radiating from a deep source. Drilling platform 1308 generally includes mud pumps 1324, and other relatively noisy support equipment. A single geophone or geophone subarray could also be used as a seismic receiver, preferably spaced apart from pumps 1324. Although a land-based drilling rig is shown, those skilled in the art will understand that a similar configuration can be applied to an offshore drill rig with geophones or hydrophones located on the seafloor. A pilot signal receiver 1310 is disposed on drilling platform 1308. In a preferred embodiment, a pressure sensor monitoring internal pressure of the drillstring 1312 is used as a pilot signal receiver. Other pilot signals are well known in the art and can alternatively be employed. In a preferred method, the pilot pressure signal is converted to an impulse timing function as shown in FIG. 15. The conversion generates a unit delta function at times when the internal pressure crosses a threshold. The impulse timing function is cross-correlated with the signals received by the geophones by a correlator 1314 to generate a seismic record using a recording system 1316. The impulse timing function is also cross-correlated with the pilot signal to determine the arrival time of the pressure wave in the drillstring 1312. The source time can be determined from knowledge of the acoustic travel time of a pipe wave in the drillstring or by observing the pipe wave velocity directly. This information is used to determine the source time. Cross correlation with the impulse function by correlator 1314 serves to average the transmitted pulse signal with a phase delay proportional to the difference in travel time of the pipe wave and waves in the earth. FIG. 16 shows examples the pipe wave pilot signal with pressure and shear wave arrivals through the earth. The pressure and shear waves arrive before the pipe wave.

In a preferred embodiment of the invention, correlator 1314 is implemented with a seismograph equipped with hardware correlation capability to generate real time seismic images. Cross correlation can easily be achieved with software by convolution of the fast Fourier transform (FFT) of the signals (E. Oran Brigham, 1974, The Fast Fourier Transform, Chapter 13, FFT Convolution and Correlation, Prentice Hall, Englewood Cliffs, N.J.). As those of ordinary skill in the art will recognize, correlator 1314 can be implemented at least in part using a digital signal processor, or other application specific integrated circuit (ASIC), capable of processing the data received. For example, the Geometrics Geode seismograph equipped with the hardware correlator option is capable of the require processing. FIG. 13 shows a direct wave 1318 and a reflected wave 1320 propagating from source 1302 to receiver 1304. Reflected wave 1320 is deflected by a seismic reflector 1322 (such as a geophysical stratum) back to receiver 1304.

The first arrival of the seismic signal at the surface array can be used to interpret the seismic velocity of the formation from the source to the surface by comparison with the travel time of pipe waves in the drillstring, which have known length and wave velocity. This information can be used as a check shot for seismic depth correction. Sequential observations can be used to profile the velocity of formations being drilled. Abnormal trends in formation velocity can be used to detect geo-pressurized formations.

Shear wave velocity is highly sensitive to pore pressure, so shear wave velocity profiles will provide an important tool in detecting abnormal pore pressure gradients. As seen in FIG. 16, this invention is capable of generating compression waves with and without shear waves. Shear wave arrivals can easily be identified by comparing seismic records with the tool drilling at high bit weight (bit on the bottom, so that shear waves are present) and with zero bit weight (bit off the bottom, so that shear waves are not present). Thus, one aspect of the present invention is a method for detecting abnormal pore pressure gradients. The method includes the steps of periodically producing shear waves, collecting the shear wave velocity profiles, and analyzing the shear wave velocity profiles that were collected. A change in the ratio of shear wave velocity to compression wave velocity is likely a result of a change in pore pressure, and shear wave analysis can therefore provide an indication of a change in pore pressure.

If the source is actuated with the bit off the bottom by more than the length of the tool, the pressure pulse generated in the borehole has low amplitude. The tool still generates the same acoustic wave propagating up the drillstring. This configuration can be used to calibrate the receiver response to acoustic waves propagating up the drillstring and coupling laterally into the earth at points of contact between the drillstring and the borehole or at the surface, to generate drillstring multiples that can complicate the interpretation of seismic records. This fully off-bottom signal can be used to identify drillstring multiples that can subsequently be compensated by removal from the seismic record.

Figure 14:
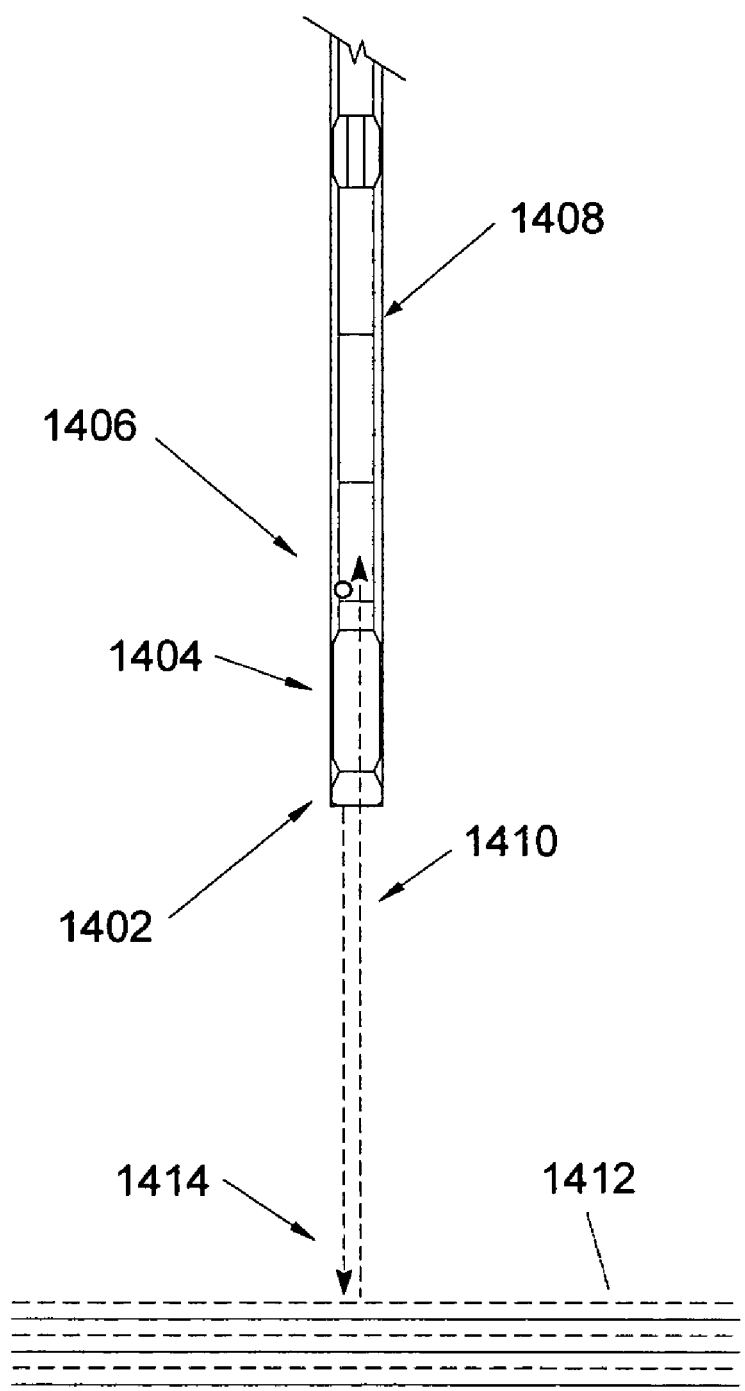
FIG. 14 shows the frequency modulator of the second aspect of the present invention being used for look-ahead seismic imaging while drilling.

High-frequency seismic signals transmitted to the surface may be highly attenuated in near-surface sediments. A seismic receiver may be placed near the source on a drillstring to minimize the travel distance of the seismic wave from the source to a reflection target ahead of the bit and back to the receiver. This configuration may be used for high-resolution seismic imaging of formations ahead of the bit. FIG. 14 shows a source 1404 (i.e., the pulse valve and frequency modulator combination described above) disposed on a drillstring proximate a drill bit 1402. A seismic receiver 1406 is also disposed on the drillstring, proximate to and proximal of source 1404. When bit 1402 is at the bottom of borehole 1408 and source 1404 is active, a pressure wave propagates away from source 1404 in all directions. The pressure wave includes a pulse 1414 that propagates downwardly. Pulse 1414 is reflected by a seismic reflector 1412 (such as a geologic stratum) disposed below bit 1402, producing a reflected pulse 1410 that propagates upwardly, where it is detected by seismic receiver 1406. In this example, the noise level at the receiver is very high while drilling due to mud flow, the impact of the drill bit on the bottom, and vibrations in the drillstring. However, because the pulse generated by swept impulse source 1404 are high-amplitude, broadband, and continuous, it is still quite feasible to extract a useful high-resolution seismic image of formations ahead of the bit.

Although the invention has been described in connection with the preferred form of practicing it and modifications thereto, those of ordinary skill in the art will understand that many other modifications can be made to the invention within the scope of the claims that follow. Accordingly, it is not intended that the scope of the invention in any way be limited by the above description, but instead be determined entirely by reference to the claims that follow.

The invention claimed is:

1. A valve configured for generating a pressure pulse within a conduit by at least partially interrupting flow of a pressurized fluid circulating through the conduit, comprising:
   (a) an inlet port configured to couple in fluid communication with the conduit through which the pressurized fluid is circulating;
   (b) an outlet port configured to couple in fluid communication with the conduit through which the pressurized fluid is circulating;
   (c) a plurality of fluid passages configured to selectively couple in fluid communication with said inlet port;
   (d) a poppet that is actuated by the pressurized fluid to cycle between an open position and a closed position, such that when in said closed position, said poppet at least partially interrupts a flow of the pressurized fluid through said outlet port; and
   (e) a pilot disposed within said poppet, said pilot being reciprocated back and forth between first and second positions during each cycle by the pressurized fluid, such that a position of said pilot determines which of said plurality of fluid passages is coupled in fluid communication with said inlet port.

2. The valve of claim 1, wherein the plurality of fluid passages include at least one fluid passage configured to divert a flow of pressurized fluid upstream of said outlet port when said poppet is in the closed position, thereby substantially reducing a water hammer effect.

3. The valve of claim 1, wherein the plurality of fluid passages include at least one fluid passage configured to divert a flow of pressurized fluid downstream of said outlet port when said poppet is in the closed position, thereby at least partially reducing a water hammer effect.

4. The valve of claim 1, wherein said pilot is coaxially disposed within said poppet.

5. The valve of claim 1, wherein said plurality of fluid passages include:
   (a) a first passage through which the pressurized fluid is applied to said poppet to cause said poppet to cycle to said closed position, thereby closing said outlet port, when said pilot is in said first position;
   (b) a second passage through which the pressurized fluid is applied to said pilot to cause said pilot to shift to said second position when said poppet is in said closed position;
   (c) a third passage through which the pressurized fluid is applied to said poppet to cause said poppet to cycle to said open position when said pilot is in said second position; and
   (d) a fourth passage through which the pressurized fluid is applied to said pilot to cause said pilot to shift to said first position when said poppet is in said open position.

6. The valve of claim 1, wherein a cycle time of the valve is a function of a size of said plurality of fluid passages.

7. The valve of claim 1, wherein said pilot is configured to move with said poppet when said pilot is in said first position, such that when said poppet moves from said open position to said closed position, a momentum imparted to said pilot facilitates said pilot shifting to said second position.

8. The valve of claim 1, wherein said poppet comprises a first bushing and a second bushing, said first and second bushings being configured to limit a range of motion of said pilot within said poppet.

9. The valve of claim 1, further comprising a housing in which the valve is disposed.

10. The valve of claim 9, wherein said housing is adapted to be incorporated in a drillstring.

11. The valve of claim 9, wherein said housing is configured to isolate a section of conduit, such that the at least partial interruption of pressurized fluid in the conduit by the valve generates a negative pressure pulse in said section of conduit that is isolated.

12. The valve of claim 11, wherein said housing comprises a high speed flow course adapted to couple said section of conduit that is isolated in fluid communication with a non-isolated section of conduit.

13. The valve of claim 12, wherein a cycle time required for the poppet to cycle between the open position and the closed position is less than or equal to a two-way travel time of an acoustic pressure wave in a length of the high speed flow course.

14. The valve of claim 1, further comprising an on/off mechanism having an on position and an off position, such that when said on/off mechanism is in said off position, said poppet is held in said open position, preventing the valve from cycling.

15. The valve of claim 14, wherein said on/off mechanism is sensitive to a pressure in the conduit, such that said on/off mechanism changes from said off position to said on position after the pressure within the conduit reaches a predetermined level.

16. The valve of claim 1, wherein the at least partial interruption of the flow of pressurized fluid by actuation of the valve generates a pressure pulse that propagates away from the valve.

17. The valve of claim 1, further comprising a frequency modulator configured to repeatedly vary the cycle rate of the valve.

18. The valve of claim 17, wherein said frequency modulator comprises a variable volume in fluid communication with a timing shaft, said timing shaft being coupled with said pilot, such that a change in said variable volume produces a corresponding change in a motion of said pilot, thereby changing a cycling rate of the valve.

19. The valve of claim 18, wherein said frequency modulator changes said variable volume after the valve completes each cycle.

20. The valve of claim 18, wherein said frequency modulator comprises a rotary indexing mechanism that changes said variable volume after the valve completes each cycle, such that each complete revolution of said rotary indexing mechanism generates a substantially similar modification of the valve cycle.

21. Apparatus for at least partially interrupting flow of a pressurized fluid that is circulating though a conduit, comprising:
   (a) a housing; and
   (b) a valve substantially enclosed by said housing, said valve comprising;
      (i) an inlet port configured to couple in fluid communication with the conduit through which the pressurized fluid is circulating;
      (ii) an outlet port configured to couple in fluid communication with the conduit through which the pressurized fluid is circulating;
      (iii) a plurality of fluid passages configured to selectively couple in fluid communication with said inlet port;
      (iv) a first member that is actuated by the pressurized fluid to cycle between an open position and a closed position, such that when in said closed position, said first member at least partially interrupts a flow of the pressurized fluid through the outlet port; and (v) a second member disposed within said first member, the second member being reciprocated back and forth between first and second positions during each cycle by the pressurized fluid, a position of said second member determining which of said plurality of fluid passages is coupled in fluid communication with said inlet port.

22. The apparatus of claim 21, wherein said plurality of passages comprises:

(a) a first passage through which the pressurized fluid is applied to said first member to cause said first member to cycle to said closed position, thereby closing the outlet port, when said second member is in said first position, (b) a second passage through which the pressurized fluid is applied to said second member to cause said second member to shift to said second position when said first member is in said closed position;

(c) a third passage through which the pressurized fluid is applied to said first member to cause said first member to cycle to said open position when said second member is in said second position; and (d) a fourth passage through which the pressurized fluid is applied to said second member to cause said second member to shift to said first position when said first member is in said open position.

23. The apparatus of claim 22, wherein said second member is configured to move with said first member, such that when said second member is in said first position and said first member moves from said open position to said closed position, the movement of said first member imparts a momentum to said second member, thereby urging said second member to move to said second position.

24. The apparatus of claim 21, wherein said second member is disposed coaxially within said first member.

25. The apparatus of claim 21, wherein said housing is configured to isolate a portion of the conduit, such that when the portion of the conduit that is isolated is coupled in fluid communication with a portion of the conduit that is not isolated by a high velocity fluid flow course, interruption of pressurized fluid in the conduit by cycling the valve causes a negative pressure pulse in the section that is isolated.

26. The apparatus of claim 25, wherein the high velocity flow course is defined at least in part by the housing.

27. The apparatus of claim 21, wherein when the conduit is disposed inside a borehole, the at least partial interruption of the flow of pressurized fluid caused by the valve generating a seismic pulse that propagates into a formation surrounding the borehole adjacent to the valve, the seismic pulse enabling information about the formation and about a location of the valve to be determined.

28. The apparatus of claim 21, wherein when the apparatus is disposed at a closed end of the conduit, the at least partial interruption of the flow of pressurized fluid by the valve generates a pressure pulse that propagates upstream of the valve while the valve is closed, thereby transferring a momentum of the fluid to the apparatus to urge the apparatus to move in a downstream direction.

29. The apparatus of claim 21, wherein said plurality of passages comprises at least one fluid passage configured to divert a flow of pressurized fluid away from said outlet port when said first member is in the closed position, thereby at least partially reducing a water hammer effect.

30. A method for generating pressure pulses within a conduit by at least partially interrupting flow of a pressurized fluid circulating through the conduit, comprising the steps of:

(a) introducing a pressure activated flow interruption valve into the conduit, the valve being configured to periodically at least partially interrupt a flow of the pressurized fluid in the conduit;

(b) circulating the pressurized fluid through the conduit; and (c) directing the pressurized fluid through the valve to cyclically actuate the valve, actuation of the valve being implemented by:

(i) using the pressurized fluid to cause a first valve member to cycle between an open position and a closed position, such that when in the closed position, the first valve member at least partially interrupts a flow of the pressurized fluid through the valve, thereby at least partially interrupting a flow of the pressurized fluid in the conduit; and (ii) using the pressurized fluid to cause a second valve member disposed within the first valve member to reciprocate between a first position and a second position, a position of the second valve member controlling the cycling of the first valve member by the pressurized fluid.

31. The method of claim 30, further comprising the step of redirecting at least a portion of the flow of the pressurized fluid within the conduit such that the step of directing the pressurized fluid through the valve to cyclically actuate the valve to at least partially interrupt the flow of the pressurized fluid in the conduit does not completely interrupt a circulation of the pressurized fluid in the conduit, thereby at least partially reducing a water hammer effect.

32. The method of claim 31, wherein the step of redirecting at least a portion of the flow of the pressurized fluid within the conduit comprises the step of redirecting at least a portion of the flow of the pressurized fluid upstream of a portion of the conduit where the pressure activated flow interruption valve at least partially interrupts the flow of the pressurized fluid in the conduit.

33. The method of claim 31, wherein the step of redirecting at least a portion of the flow of the pressurized fluid within the conduit comprises the step of redirecting at least a portion of the flow of the pressurized fluid downstream of a portion of the conduit where the pressure activated flow interruption valve at least partially interrupts the flow of the pressurized fluid in the conduit.

34. The method of claim 30, wherein the step of using the pressurized fluid to cause the second valve member disposed within the first valve member to reciprocate between the first position and the second position comprises the step of causing the second valve member to move coaxially within the first valve member.

35. The method of claim 30, wherein the step of directing the pressurized fluid through the valve to cyclically actuate the valve comprises the steps of:

(a) directing the pressurized fluid through a first passage to cause the first valve member to cycle to the closed position, when the second valve member is in the first position;

(b) directing the pressurized fluid through a second passage to cause the second valve member to shift to the second position when the first valve member is in the closed position;

(c) directing the pressurized fluid through a third passage to cause the first valve member to cycle to the open position when the second valve member is in the second position; and (d) directing the pressurized fluid through a fourth passage to cause the second valve member to shift to the first position when the first valve member is in the open position.

36. The method of claim 35, further comprising the step of controlling a cycle time of the valve by controlling a size of the first, second, third and fourth passages.

37. The method of claim 30, further comprising the step of using the first valve member to impart a momentum to the second valve member when the first valve member moves from the open position to the closed position, thereby facilitating a movement of the second valve member from the first position to the second position.

38. The method of claim 30, further comprising the step of isolating a section of the conduit, such that the at least partial interruption of the pressurized fluid in the conduit by the pressure activated flow interruption valve generates a negative pressure pulse in the section of conduit that is isolated.

39. The method of claim 30, further comprising the step of selectively holding the first valve member in the open position, thereby preventing the valve from cycling.

40. The method of claim 39, wherein the step of selectively holding the first valve member in the open position comprises the step of holding the first valve member in the open position as a function of pressure, such that the valve does not begin to cycle until a pressure within the conduit reaches a predetermined level.

41. The method of claim 30, further comprising the step of selectively varying a cycle rate of the valve.

42. The method of claim 41, wherein the step of selectively varying a cycle rate of the valve comprises the step of introducing a portion of the pressurized fluid in the valve into a variable volume, such that a change in the variable volume produces a corresponding change in a motion of the second valve member, thereby changing a cycling rate of the valve.

43. The method of claim 41, wherein the step of selectively varying a cycle rate of the valve comprises the step of varying the cycle rate of the valve after the valve completes each cycle.

44. The method of claim 41, wherein the step of selectively varying a cycle rate of the valve comprises the step of varying the cycle rate according to a repetitive pattern.

45. A method for generating pressure pulses within a conduit by at least partially interrupting flow of a pressurized fluid circulating through the conduit, comprising the steps of:

(a) introducing a pressure activated flow interruption valve into the conduit, the valve being configured to periodically interrupt a flow of the pressurized fluid in the conduit, a flow of the pressurized fluid through the valve causing the valve to cycle between an open position and a closed position, such that when in the closed position, the valve at least partially interrupts a flow of the pressurized fluid through the conduit;

(b) circulating the pressurized fluid through the conduit; and (c) directing the pressurized fluid through the valve to cyclically actuate the valve, such that:

(i) a first valve member is actuated by the pressurized fluid to cycle between a first position and a second position, such that when in the second position, the first valve member at least partially interrupts a flow of the pressurized fluid through the valve, causing the valve to be in the closed position; and (ii) a second valve member disposed within the first valve member is reciprocated back and forth between another first position and another second position during each cycle by the pressurized fluid, the second valve member controlling actuation of the first valve member by the pressurized fluid.

46. A method for generating pressure pulses within a conduit by at least partially interrupting flow of a pressurized fluid circulating through the conduit, comprising the steps of:

(a) coupling a pressure activated flow interruption valve to the conduit, the valve being configured to periodically interrupt a flow of the pressurized fluid in the conduit, a flow of the pressurized fluid through the valve causing the valve to cycle between an open position and a closed position, the pressure activated flow interruption valve comprising:

(i) a poppet that is actuated by the pressurized fluid to cycle between an open position and a closed position, such that when in the closed position, the poppet at least partially interrupts a flow of the pressurized fluid through the valve; and (ii) a pilot disposed within the poppet, the pilot being reciprocated back and forth between first and second positions during each cycle by the pressurized fluid, such that a position of the pilot controls the pressurized fluid that actuates the poppet;

(b) circulating the pressurized fluid through the conduit; and (c) directing the pressurized fluid through the valve to cyclically actuate the valve, thereby periodically interrupting a flow of the pressurized fluid in the conduit as the valve cycles between the open position and the closed position.

* * * * *